(12) United States Patent
Kaneko et al.

(10) Patent No.: US 6,671,454 B1
(45) Date of Patent: Dec. 30, 2003

(54) PROGRAM INFORMATION PROVIDING APPARATUS AND RECORD/PLAYBACK CONTROL APPARATUS

(75) Inventors: Yuji Kaneko, Tokyo (JP); Yoshihide Kikuchi, Tokyo (JP); Koichi Funaya, Tokyo (JP); Katsuaki Yamamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/443,379

(22) Filed: Nov. 19, 1999

(30) Foreign Application Priority Data

Nov. 19, 1998 (JP) .......................................... 10-329316

(51) Int. Cl.[7] .................................................. H04N 5/91
(52) U.S. Cl. .......................................... 386/83; 725/58
(58) Field of Search ........................ 386/1, 83; 725/38, 725/39, 46, 48, 50, 51, 54, 58; 375/240.17; 709/249

(56) References Cited

U.S. PATENT DOCUMENTS

| | | | |
|---|---|---|---|
| 5,657,072 A | * | 8/1997 | Aristides et al. .............. 725/46 |
| 5,978,855 A | * | 11/1999 | Metz et al. ................. 709/249 |
| 6,020,880 A | * | 2/2000 | Naimpally .................... 725/48 |
| 6,230,324 B1 | * | 5/2001 | Tomita et al. ................. 725/51 |
| 6,389,076 B2 | * | 5/2002 | Bakhmutsky et al. .. 375/240.17 |

FOREIGN PATENT DOCUMENTS

| | | |
|---|---|---|
| EP | 0 836 320 | 4/1998 |
| EP | 0 836 321 | 4/1998 |
| EP | WO 98 42129 | 9/1998 |
| JP | 07-21619 | 1/1995 |
| JP | 07-107461 | 4/1995 |
| JP | 09-307846 | 11/1997 |
| JP | WO 97 46013 | 12/1997 |
| JP | 10-243303 | 9/1998 |
| JP | 11-98478 | 4/1999 |
| JP | 11-136646 A | 5/1999 |

OTHER PUBLICATIONS

European Broadcasting Union: "digital broadcasting systems for television, sound and data services; specification for service information (SI) in digital broadcasting (DVB) systems", Oct. 1995, European Telecommunications Standards Institute, Sophia Antipolis (FR) XP002079535.

* cited by examiner

Primary Examiner—Thai Tran
Assistant Examiner—Christopher Onuaku
(74) Attorney, Agent, or Firm—Foley & Lardner

(57) ABSTRACT

An apparatus for recording and playback of digital broadcasts determines programs that can be played and recorded simultaneously in accordance with a bit rate of each program to be recorded and played back and the performance capacity on which programs are recorded. Bit rate information for programs is provided in conjunction with information identifying the programs in an electronic program guide received by the apparatus.

38 Claims, 16 Drawing Sheets

Bit Rate Information for Each Channel

| Channel Name | ABC – 1 |
|---|---|
| Broadcast Bit Rate [Kbps] | 6000 |

Bit Rate Information for Each Station

| Station Name | ABC |
|---|---|
| Broadcast Bit Rate [Kbps] | 6000 |

| Program Name | Start Time | End Time |
|---|---|---|
| A | 17 : 00 | 18 : 00 |
| B | 21 : 00 | 23 : 00 |
| | | |
| ⋮ | ⋮ | ⋮ |
| | | |

PROGRAM INFORMATION PROVIDING APPARATUS AND RECORD/PLAYBACK CONTROL APPARATUS

BACKGROUND OF THE INVENTION

1. Field of the Invention

The present invention relates to a video record/playback control apparatus capable of simultaneously recording a plurality of contents such as video decks, video servers or the like, and more particularly to preset recording control when a plurality of contents during the same time period are preset for recording and to a re-compression process for coded content data.

2. Description of the Prior Arts

The most primitive technique for recording a plurality of programs or contents broadcast during the same time period includes providing a plurality of VTRs (video tape recorders) and recording different programs with respective VTRs.

JP-A-10-243303 and JP-A-07-021619 propose preset recording control apparatuses which perform preset recording control for a plurality VTRs with a remote controller to manage schedules of which program being recorded by which VTR in order to simultaneously record a plurality of contents during the same time period. Each of VTRs in the proposals can only one content during the same time period. For this reason, in schedule management, a maximum number of contents recordable during the same time period is defined as the number of VTRs.

JP-A-09-307846 discloses a technology in which pictures are reduced in size and combined for recording on a single storage medium in tape shape and are enlarged for playback, thereby recording a plurality of contents during the same time period. In this case, a maximum number of contents recordable during the same time period can be calculated from bit rates of contents for which a VTR compresses pictures and the throughput performance of the VTR. However, a maximum number of contents recordable during the same period is known within the VTR.

Additionally, JP-A-7-107461 and JP-A-11-98478 disclose a video coding technique for re-compressing video which has been once coded and compressed. When the technique is used, video stored in a storage device is re-compressed and stored again in the storage device, thereby allowing an increase in free space in the storage device.

FIG. 24 is a block diagram showing a configuration for increasing a free space in a storage device using a conventional re-compressing method. The configuration comprises content reading unit 901 for reading out contents from storage device 904 which stores coded contents, re-compressing unit 902 for re-compressing the read coded information, and content writing unit 903 for writing re-coded data into storage device 904. In the configuration, re-compression is performed by a user specifying contents and timing for re-compression.

Presently, in various countries, shift plans are underway from conventional analog broadcast to digital broadcast for television broadcasting. In digital broadcast, video pictures are compressed and broadcast in encoding schemes for various image quality typified by HDTV (High Definition Television) or SDTV (Standard Definition Television). Since images are compressed for each content so as to match characteristics of the respective encoding schemes with characteristics of contents, bit rates of the contents to be broadcast may vary to a degree the highest one is four times or more than the lowest one.

When recording is made in such digital broadcast, image compression enables a plurality of contents to be simultaneously recorded within a range of processing capability of a record/playback control apparatus. However, since the sum of bit rates of contents to be simultaneously recorded is previously unknown in digital broadcast in which contents are sent with different bit rates, it is impossible to previously know how many contents of pictures can be simultaneously recorded. Therefore, allowing for a margin of safety, each VTR can preset for recording only one content at a time, similarly to the case disclosed JP-A-10-243303 or JP-A-07-021619.

Apparatus for recording video pictures include hard disk drives (HDDs) in addition to VTRs. The hard disk drive has a higher bit rate for reading and writing, and favorable random access characteristics as compared with VTRs. The hard disk drive can record and play back larger number of contents simultaneously. However, when a bit rate of a content is unknown previously, the bit rate of the content is assumed to be high, thereby causing a problem that the number of contents preset for simultaneous recording need be set to be in a range much lower than capability inherent in the hard disk drive.

SUMMARY OF THE INVENTION

It is an object of the present invention to provide a record/playback control apparatus capable of presetting for simultaneous recording in digital recording for digital broadcast, setting the number of contents to be preset for simultaneous recording making the most of processing capability of playback/recording, and appropriate presetting at the time when user presets recording of contents.

It is another object of the present invention to provide a program information providing apparatus for delivering program information or Electronic Programming Guides (EPG) to the aforementioned record/playback control apparatus. As to the EPG, details can be acquired on the Internet, http://www.infomedia.lu/9epg.htm In the record/playback control apparatus of the present invention, information on bit rate of each content described in the delivered EPG is extracted, and the sum of bit rates of contents preset for simultaneous playback and recording is compared with a bit rate in processing capability of a storage device at the presetting of a recording, thereby determining whether or not the recording is possible. In other words, it is possible to determine whether a preset recording exceeds the capability of the storage device at the presetting of the recording. For this reason, a preset recording can be processed without fail.

Typically, the record/playback control apparatus according to the present invention comprises program information acquiring means for acquiring and extracting an electronic programming guide in which a bit rate of a content is described; program information storage means for storing the electronic programming guide; preset recording input means for receiving preset recording information; recording/playback preset total bit rate calculating means for calculating a total bit rate of contents preset for recording/playback at a particular time; recording/playback presetting storage means for storing recording/playback presetting; preset recording registering means for registering a new preset recording; preset recording possible/impossible display means for displaying whether a preset recording is possible or not; and preset recording possible/impossible determining means for determining whether a preset recording is possible or not using the bit rate of a content described in the electronic programming guide.

In the record/playback control apparatus of the present invention, several ways of processing are possible when an EPG can not be acquired. For example, as first processing, a preset recording is rejected when an EPG can not be acquired. With this processing, it is possible to avoid a preset recording which exceeds the processing capability of the storage device which may occur by an impossible preset recording when an EPG can not be acquired. As second processing, when an EPG can not be acquired, the bit rate of a previously stored content is handled as a bit rate of a content preset for recording, and the sum of bit rates of contents preset for simultaneous playback and recording at the time set by the preset recording is compared with the bit rate in the processing capability of the storage device, thereby determining whether or not the recording is possible. With this processing, even when an EPG can not be acquired, it is possible to determine, at the presetting of the recording, whether a preset recording exceeds the processing capability of the storage device to allow a preset recording without fail of recording.

It is preferable that whether a preset recording is possible or not is determined using, as a total bit rate, a total bit rate of contents at the maximum in the same time period as a new preset recording. In other words, when a plurality of contents have overlapping portions in recording time periods, it is preferable that a recording time period corresponding to the largest number of overlaps is used to determine whether a preset recording is possible or not. Such configuration enables settings without any lack of recording of preset contents.

In the record/playback control apparatus of the present invention, bit rate changing means is also provided for changing a bit rate of a content. The bit rate changing means can change a bit rate of at least one content such that the sum of bit rates of respective contents falls within processing capability of the record/playback control apparatus when preset recording possible/impossible determining means determines that a new preset recording is not possible. With this configuration, even when presetting of a recording is performed beyond the capability of the storage device, a total bit rate can fall within the capability of the storage device to enable settings without any lack of recording of preset contents. To achieve this, for example, it is desirable to provide re-compressing means for further compressing contents stored in the storage device.

The program information providing apparatus of the present invention is characterized in that it comprises, at least, delivery controlling means for controlling the delivery of an EPR, program information delivering means for delivering an EPG, and program information creating means for describing a bit rate of a content in an EPG, and that it delivers an EPG which has a bit rate of a content described therein using a bidirectional communication line, ground broadcasting, satellite broadcasting or a storage medium. When a bidirectional communication line is used, it is preferable to further provide delivery request receiving means for receiving a delivery request for EPG.

Specifically, the use of the program information providing apparatus of the present invention enables a bit rate of a content to be previously known in a record/playback control apparatus capable of simultaneously recording/playing back a plurality of contents which receives an EPG. As a result, whether a content is recordable or not can be determined at the presetting of the recording prior to broadcasting of the content, thereby allowing an appropriate preset recording.

The above and other objects, features, and advantages of the present invention will become apparent from the following description based on the accompanying drawings which illustrate examples of preferred embodiments of the present invention.

DESCRIPTION OF THE PREFERRED EMBODIMENTS

Figures 1, 2:
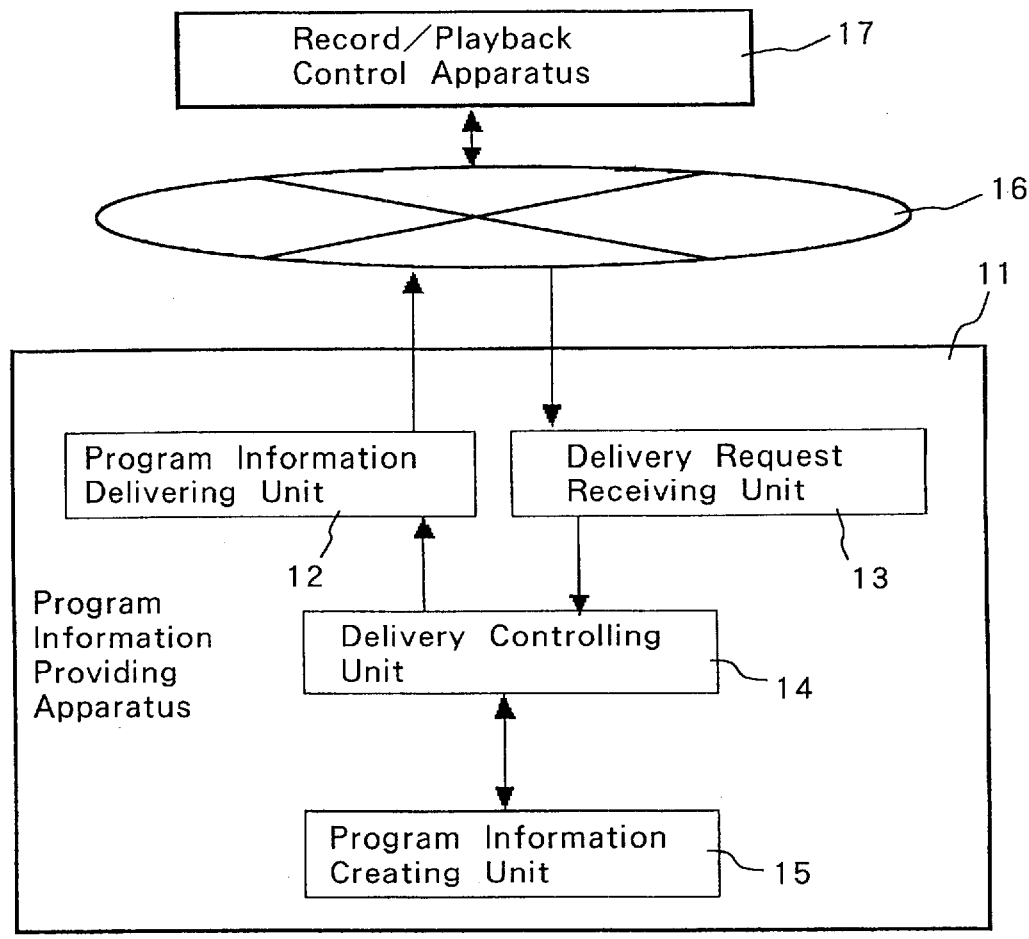
FIG. 1 is a block diagram showing a configuration of a program information providing apparatus using a bidirectional communication path according to a preferred embodiment of the present invention.
FIG. 2 is a diagram showing an example of a format of Electronic Programming Guides (EPG) indicating program information.

Program information providing apparatus 11 shown in FIG. 1 comprises delivery request receiving unit 13 for receiving a delivery request for Electronic Programming Guides (EPG) from record/playback control apparatus 17 through communication line 16; delivery controlling unit 14 for determining whether an EPG is deliverable; program information creating unit 15 for creating an EPG in which a bit rate is described for each program, for each channel, or for each station; and program information delivering unit 12 for delivering an EPG to record/playback control apparatus 17 through communication line 16. A format of an EPG is described later. As communication line 16, a bidirectional communication path is used such as an ISDN (Integrated Services Digital Network) circuit or analog telephone circuit.

Next, the operation of the program information providing apparatus will be described.

When a delivery request for EPG is received by delivery request receiving unit 13 from record/playback control apparatus 17 through communication line 16, delivery request receiving unit 13 passes the request to delivery controlling unit 14. Delivery controlling unit 14 determines whether an EPG corresponding to the request is deliverable, and if determining that it is deliverable, passes an EPG created by program information creating unit 15 to program information delivering unit 12 which delivers the EPG to record/playback control apparatus 17 through communication line 16. On the other hand, if delivery controlling unit 14 determines that the EPG is not deliverable, program information delivering unit 12 notifies record/playback control apparatus 17, through communication line 16, of the fact that the EPG is not deliverable. In such processing, program information creating unit 15 describes a bit rate for each program (FIG. 2), for each channel (FIG. 3), or for each station (FIG. 4) in an EPG.

In this manner, the EPG in which a bit rate of a content is described is delivered to record/playback control apparatus 17 which can easily determine whether a recording is possible or not at the presetting of the recording. The use of program information providing apparatus 11 shown in FIG. 1 can provide information for allowing an appropriate preset recording at the stage of presetting in performing the presetting of the recording particularly when record/playback control apparatus 17 can preset a plurality of contents for simultaneous recording.

Next, contents of an EPG will be described using FIG. 2 to FIG. 4.

FIG. 2 shows an example of an EPG described for each program in which broadcast bit rate 26 is described. In the EPG, at least six items of information are described for each program; station name 21, broadcast date 22, program identifier 23, broadcast start time 24, broadcast end time 25, and broadcast bit rate 26.

Figures 3, 4, 5:
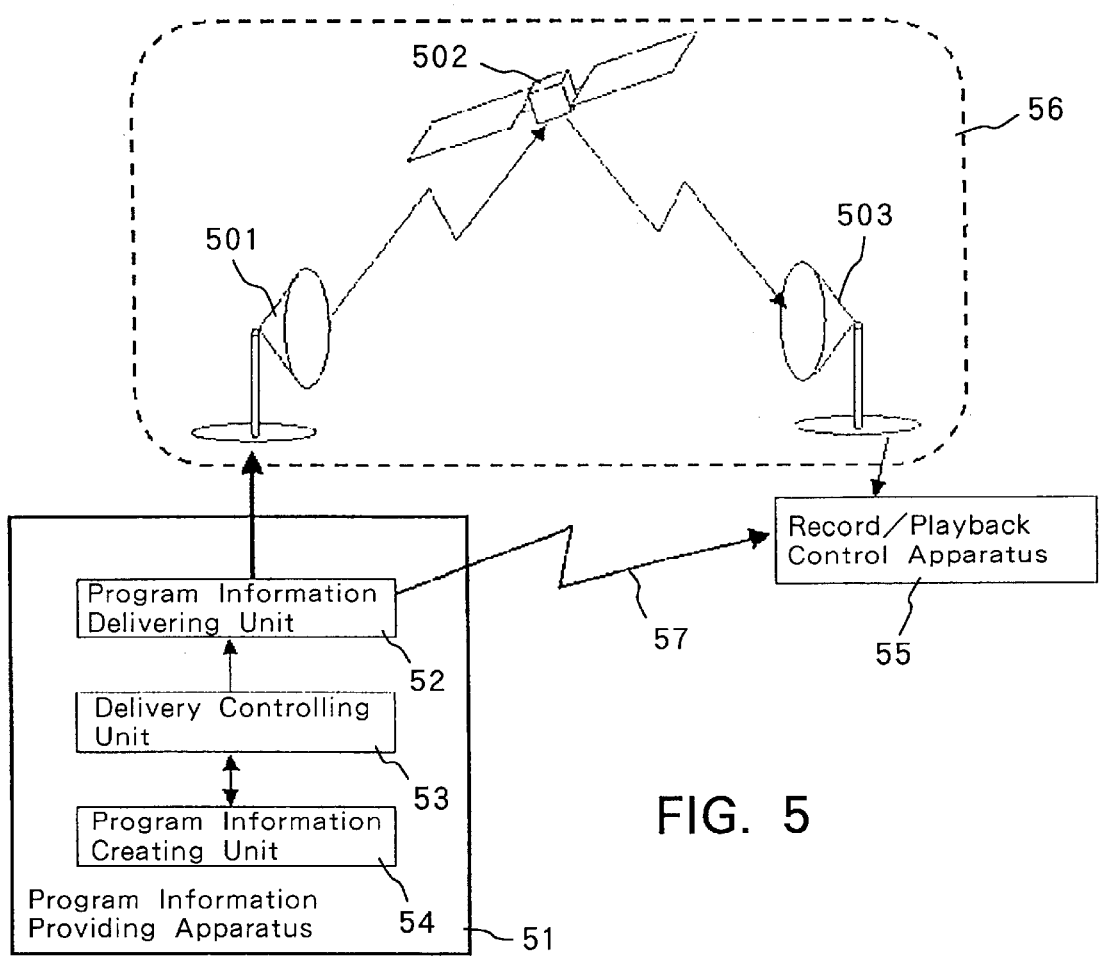
FIG. 3 is a diagram showing another example of a format of the EPG indicating channel bit rate information.
FIG. 4 is a diagram showing a yet further example of a format of the EPG indicating bit rate information for respective stations.
FIG. 5 is a block diagram showing a configuration of another program information providing apparatus using ground broadcasting or satellite broadcasting based on the present invention.

FIG. 3 shows an EPG for each channel in which at least channel name 31 and broadcast bit rate 32 are described.

FIG. 4 shows an EPG for each station in which at least station name 41 and broadcast bit rate 42 are described.

While program information providing apparatus 11 shown in FIG. 1 delivers an EPG when record/playback control apparatus 17 issues a request, a program information providing apparatus based on the present invention is not limited thereto. For example, even when an EPG is unilaterally delivered from a program information providing apparatus to a record/playback control apparatus as one form of services of push type which are operated under names such as "Pointcast™" over Internet, similar effects to those of the aforementioned case can be obtained.

FIG. 5 is a diagram showing program information providing apparatus 51 which unilaterally delivers an EPG to record/playback control apparatus 55. Program information providing apparatus 51 comprises program information delivering unit 52 for delivering an EPG to record/playback control apparatus 55 through satellite broadcasting 56 or ground broadcasting 57; delivery controlling unit 53 for controlling the delivery of an EPG; and program information creating unit 54 for creating an EPG including a bit rate of a content. The path of satellite broadcasting 56 is formed from transmitting antenna 501 connected to program information providing apparatus 51, satellite 502 in orbit, and receiving antenna 503 connected to record/playback control apparatus 55.

In program information providing apparatus 51 shown in FIG. 5, an EPG created in program information creating unit 54 is passed to delivery controlling unit 53 which passes the EPG to program information delivering unit 52 at the timing of delivery, and the EPG is delivered through ground broadcasting 57 or satellite broadcasting 56. In the EPG, a bit rate of a content is described for each program, each channel, or each station as shown in FIG. 2 to FIG. 4 described above. Similar effects to those of the program information providing apparatus shown in FIG. 1 can be also obtained in this program information providing apparatus.

Figure 6:
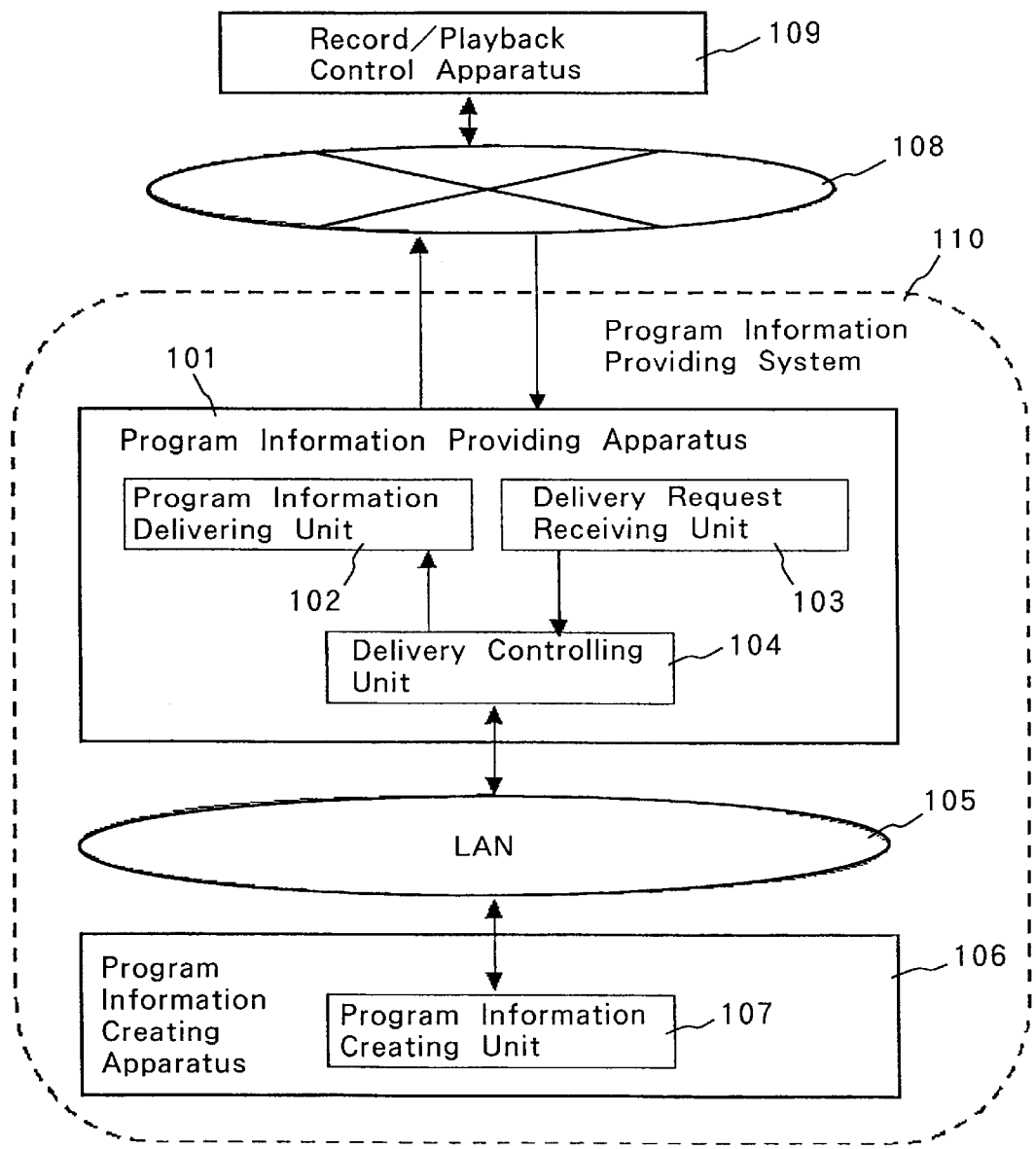
FIG. 6 is a block diagram showing an example of a configuration of a program information providing system based on the present invention.

Additionally, the present invention is not limited to an EPG created by a program information creating unit within a program information providing apparatus. FIG. 6 shows program information providing system 110 in which program information creating apparatus 106 having program information creating unit 107 is connected to program information providing apparatus 101 having program information delivering unit 102, delivery request receiving unit 103 and delivery controlling unit 104, through local area network (LAN) 105 such as Ethernet™ or ATM (Asynchronous Transfer Mode) network. The program information providing system is connected to record/playback control apparatus 109 through communication line 108. Program information delivering unit 102, delivery request receiving unit 103, delivery controlling unit 104 and program information creating unit 107 have functions equivalent to those of program information delivering unit 12, delivery request receiving unit 13, delivery controlling unit 14 and program information creating unit 15 in the program information providing apparatus shown in FIG. 1, respectively.

In program information providing system 110, an EPG created by program information creating unit 107 in program information creating apparatus 106 is transferred to delivery controlling unit 104 in program information providing apparatus 101 through local area network 105. Other operations are similar to those of the program information providing apparatus shown in FIG. 1. In an EPG, a bit rate of a content is described for each program, each channel, or each station as shown in FIG. 2 to FIG. 4 described above. The EPG may be transferred from program information creating unit 107 to delivery controlling unit 104 using a record medium (not shown) other than local area network 105.

While in the program information providing apparatus or program information providing system described above, an EPG having a bit rate of a content described therein is delivered to a record/playback control apparatus with a communication line or broadcasting, the present invention is not limited thereto. It is possible to deliver an EPG to a record/playback control apparatus by physically delivering a removable record medium in which the EPG is stored, and in this case, similar effects to those of the aforementioned cases can be also obtained. As a removable record medium, a floppy disk (FD), hard disk, minidisk (MD), compact disk (CD), magneto-optic (MO) disk, DVD (Digital Video Disk), flash memory, and magnetic tape are contemplated as examples. When a removable record medium is used, a writing device for the removable record medium may be used as program information delivering unit 12, 52, or 102.

Next, description will be made for a record/playback control apparatus suitable for the aforementioned respective program information providing apparatuses or program information providing system. A record/playback control apparatus described below is an apparatus for controlling record/playback operations of recording equipment which perform digital recording such as a digital VTR or hard disk drive.

Figure 7:
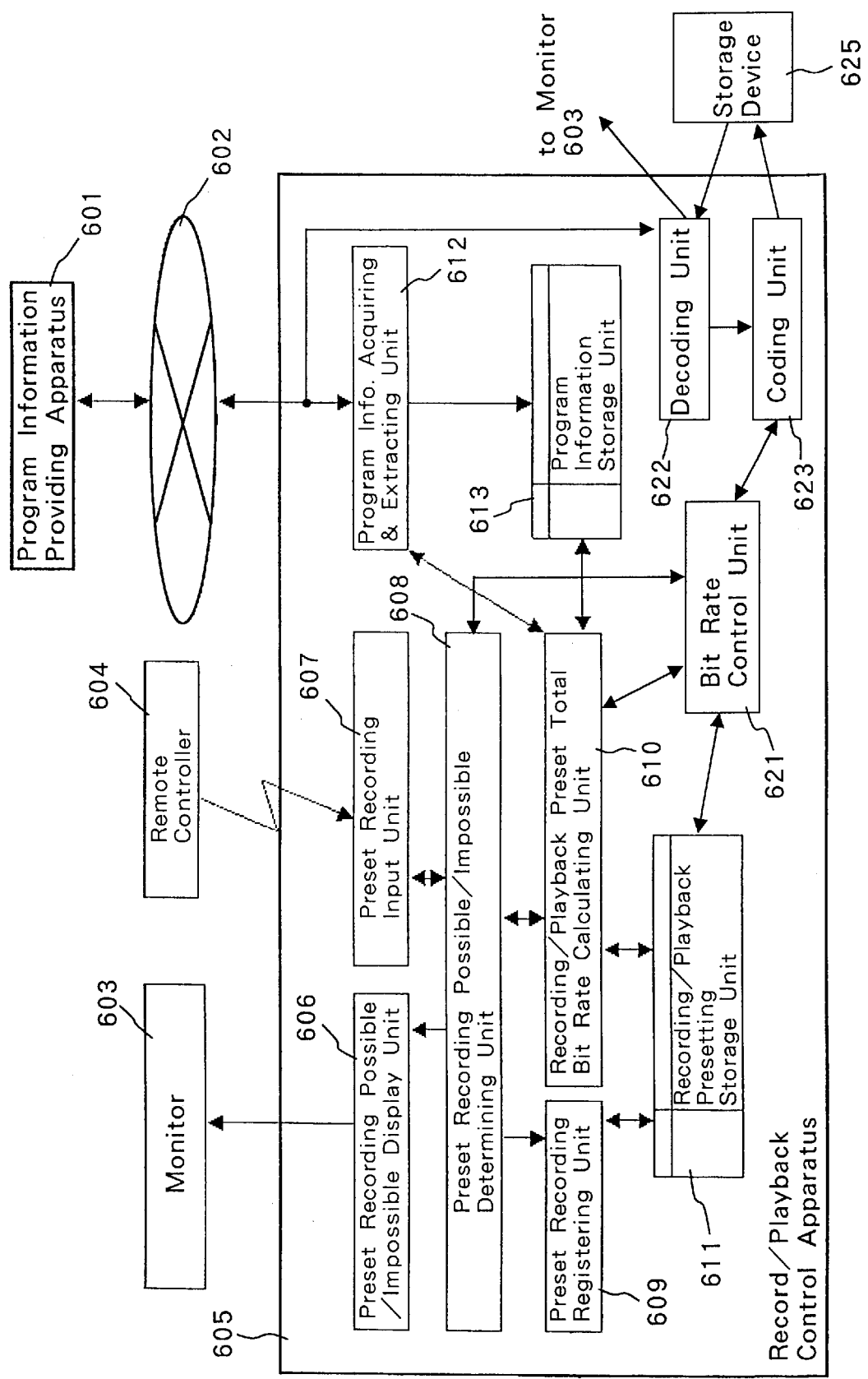
FIG. 7 is a block diagram showing an example of a configuration of a record/playback control apparatus using a bidirectional communication path based on the present invention.

Record/playback control apparatus 605 shown in FIG. 7 comprises preset recording input unit 607 for receiving and interpreting preset recording information inputted thereto; preset recording possible/impossible determining unit 608 for determining whether a preset recording based on preset recording information passed from preset recording input unit 607 is possible or not; preset recording possible/impossible display unit 606 for displaying that a preset recording is possible or not on monitor 603; program information acquiring and extracting unit 612 for acquiring and extracting an EPG from program information providing apparatus 601 to store the EPG; program information storage unit 613 for storing an EPG; recording/playback presetting storage unit 611 for storing recording/playback presetting; recording/playback preset total bit rate calculating unit 610 for reading an EPG from program information storage unit 613 and reading recording/playback presettings already set in a time period overlapping with a new preset recording from recording/playback presetting storage unit 611 to calculate a total bit rate of contents preset for recording and playback; and preset recording registering unit 609 for storing a preset recording determined to be possible at preset recording possible/impossible determining unit 608 in recording/playback presetting storage unit 611. Preset recording information is provided to preset recording input unit 607 by a user inputting information on preset recording through manipulation of remote controller 604. Program information storage unit 613 comprises a storage device such as memories or hard disks for storing an EPG, while recording/playback presetting storage unit 611 comprises a storage medium such as memories or hard disks for storing presetting for recording and playback.

With the aforementioned configuration, when preset recording possible/impossible determining unit 608 determines that a preset recording is not feasible, it is possible to display the fact to a user and to cause the user to abandon the preset recording. However, since such abandonment of a preset recording is not preferable for a user, bit rate control unit 621, decoding unit 622 and coding unit 623 are provided in the embodiment to allow a preset recording with compression of content data even when the recording is determined to be impossible. Specifically, when preset recording possible/impossible determining unit 608 determines that a preset recording is impossible, bit rate control unit 621 performs processing such that bit rates of contents preset for recording and playback are equal to or lower than a bit rate of storage device 625 on the basis of data calculated at recording/playback preset total bit rate calculating unit 610, registers the result in recording/playback presetting storage unit 611, and creates a bit rate control signal in response to the data. Decoder 622 decodes content data inputted from storage device 625 or communication line 602 and outputs the decoded content data to monitor 603. Coding unit 623 compresses and codes the decoded content data on the basis of the bit rate control signal and outputs the compressed and coded content data to storage device 625.

An EPG is transmitted to record/playback control apparatus 605 from program information providing apparatus 601 through communication line 602 using wiring such as a telephone line or ISDN line. Program information acquiring and extracting unit 612 sends a delivery request for EPG to program information providing apparatus 601 through communication line 602.

Figure 8:
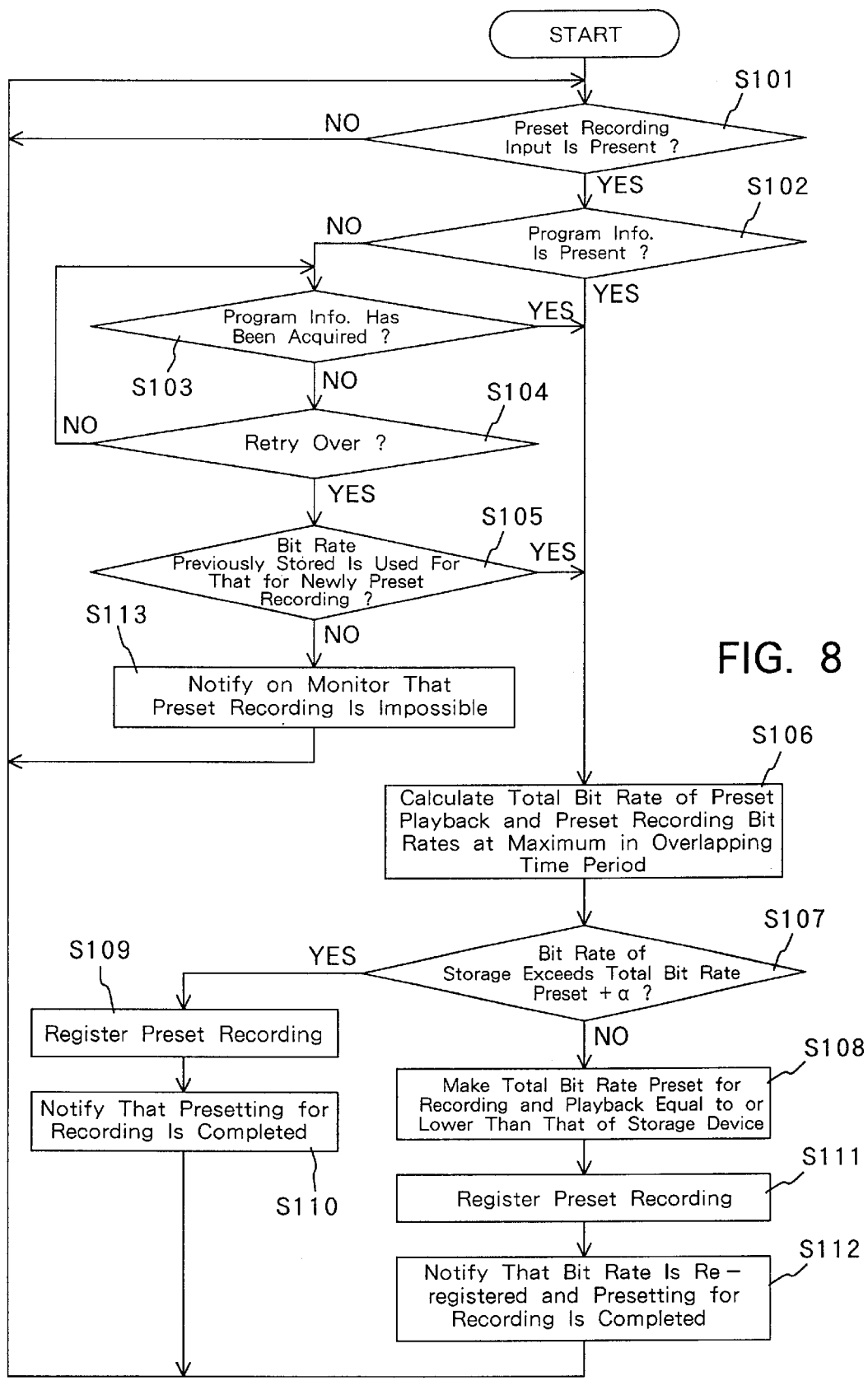
FIG. 8 is a flow chart explaining processing in the record/playback control apparatus shown in FIG. 7.

Next, the operation of record/playback control apparatus 605 will be described using a flow chart shown in FIG. 8.

First, at step S101, program presetting input unit 607 determines whether or not a preset recording input is present from remote controller 604. If no preset recording input is present, the procedure returns to step S101 to wait for a preset recording input. If a preset recording input is present, program presetting input unit 607 causes control to transfer to step S102 in order for preset recording possible/impossible determining unit 608 to determine whether the preset recording is possible or not. Processing from step S102 to step S107 below is provided for preset recording possible/impossible determining unit 608 to cause recording/playback preset total bit rate calculating unit 610 to calculate the sum of bit rates of all contents preset for recording/playback.

At step S102, recording/playback preset total bit rate calculating unit 610 reads an EPG for a program of newly preset recording from program information storage unit 613 to read a bit rate of a newly preset content for recording, and determines whether program information on preset recording input is present or not. If an EPG to be newly preset for recording is present in program information storage unit 613, control transfers to step S106, or to step S103 if no EPG is present. At step S103, program information acquiring and extracting unit 612 acquires and extracts an EPG from program information providing apparatus 601 through communication line 602 to store it in program information storage unit 613, and thereafter, it is determined whether program information on preset recording can be acquired or not.

If program information acquiring and extracting unit 612 can acquire an EPG from program information providing apparatus 610 at step S103, control transfers to step S106. On the other hand, if an EPG can not be acquired for reasons that communication line 602 can not be used or program information providing apparatus 601 can not be accessed at step S103, control transfers to step S104 where a single or a plurality of retries are performed. If retries are not overdone, control returns to step S103, or to step S105 if retries are overdone. At step S105, a bit rate of a previously stored content is stored as a bit rate of a newly preset content for recording in program information storage unit 613, and then control transfers to step S106. If the bit rate of the previously stored content is not used for the bit rate of the newly preset content for recording at step S105, preset recording possible/impossible display unit 606 notifies the user that the presetting of the recording is impossible on monitor 604 at step S113 and the process for preset recording is terminated.

At step S106, recording/playback preset total bit rate calculating unit 610 reads presetting information for recording/playback which is already set in the same time period as the new presetting for recording from recording/playback presetting storage unit 611, calculates a total bit rate of contents at the maximum in the overlapping time period, and passes it to preset recording possible/impossible determining unit 608. Thereafter, control transfers to step S107.

At step S107, preset recording possible/impossible determining unit 608 determines whether the following expression (1) is satisfied:

$$[\text{bit rate of storage device}] > [\text{total bit rate preset for recording/playback} + \alpha] \quad (1)$$

where a bit rate of a storage device is the throughput of the storage device, and $\alpha$ is a value corresponding to a predefined margin.

If the expression (1) does not hold at step S107, preset recording possible/impossible determining unit 608 directs bit rate control unit 621 to make a total bit rate preset for recording and playback equal to or lower than a bit rate of the storage device at step S108. Bit rate control unit 621 processes bit rates of respective contents for recording and playback such that the bit rate of respective contents is equal to or lower than the bit rate of storage device 625, re-registers the result in recording/playback presetting storage unit 611 as a bit rate of respective contents for recording and playback, and control transfers to step S111. At step S111, preset recording possible/impossible determining unit 608 causes preset recording registering unit 609 to register the presetting of the recording in recording/playback presetting storage unit 611. At step S112, preset recording possible/impossible display unit 606 notifies a user that the bit rate of respective contents for recording and playback is re-registered and the presetting of the recording is completed, by displaying the fact on monitor 603. Thereafter, processing returns to step S101. On the other hand, if the expression (1) holds at step S107, preset recording possible/impossible determining unit 608 causes preset recording registering unit 609 to register the preset recording in the recording/playback presetting storage unit 611 at step S109, and causes preset recording possible/impossible display unit 606 to display that the preset recording is complete on monitor 603 to notify the user of the fact at step S110, and then control transfers to step S101.

In this manner, record/playback control apparatus 605 refers to a bit rate of a content described in an EPG in performing the presetting of a recording and compares a total bit rate of contents preset for recording and playback in the same time period, i.e. a processing amount for preset recordings, with a bit rate in processing performance of the record/playback control apparatus. Whether a preset recording is possible or not is determined at the stage of presetting of a recording. This enables an appropriate preset recording without fail of recording with record/playback control apparatus 605. Additionally, whether a preset recording is possible or not is determined using a total bit rate of contents at the maximum in the same time period as a new preset recording, thereby allowing an appropriate preset recording without fail of recording even in the case of a preset recording which has only a portion of a recording time overlapping with already set contents.

In the above description, if an EPG which has a bit rate of a content described therein can not be acquired as a result of retries at step S104, control transfers to step S105 and a bit rate of a previously stored content is used in the subsequent processing in place of a bit rate of a newly preset content for recording. With such processing, it is possible to perform the presetting of a recording appropriately even if an EPG is not available.

However, the processing contents of record/playback control apparatus 605 is not limited thereto. For example, if an EPG can not be acquired at step S104, control may transfer to step S108 to make the presetting of a recording impossible. Such processing can easily prevent a failure of the presetting of a recording.

Alternatively, if the expression (1) does not hold at step S107, preset recording possible/impossible determining unit 608 may notify a user that the preset recording is impossible by displaying the fact on monitor 603 with preset recording possible/impossible display unit 606.

In record/playback control apparatus 605 shown in FIG. 7, an EPG is acquired when program information acquiring and extracting unit 612 requests program information, i.e. EPG (Electronic Programming Guides) to program information providing apparatus 601. However, the record/playback control apparatus is not limited to this configuration. The record/playback control apparatus may be configured such that the program information acquiring and extracting unit receives an EPG with delivery of push type from the program information providing apparatus and the received EPG is stored in program information storage unit 613. In the case of the record/playback control apparatus which receives delivery of push type, similar effects to the aforementioned case can be also obtained.

At the time of operation of recording/playback, bit rate control unit 621 reads the registered-bit rate of contents from recording/playback presetting storage unit 611 and the registered bit rate controls bit rate control unit 621 which outputs a bit rate control signal to coding unit 623. Simultaneously, decoding unit 622 decodes content data inputted thereto. At playback, the decoded content data is sent to monitor 603 which displays the content. At recording, the decoded content data is received by coding unit 623 which compresses and codes the decoded content data and stores it in storage device 625 with control of the bit rate control signal. Examples of methods of controlling a bit rate may include control of a time average value of bit rates for allocating codes in accordance with values of bit rates. Another example of methods of controlling a bit rate may include control of color difference information in accordance with values of bit rates. A yet further example of methods of controlling a bit rate may include control of brightness information in accordance with values of bit rates.

Figure 9:
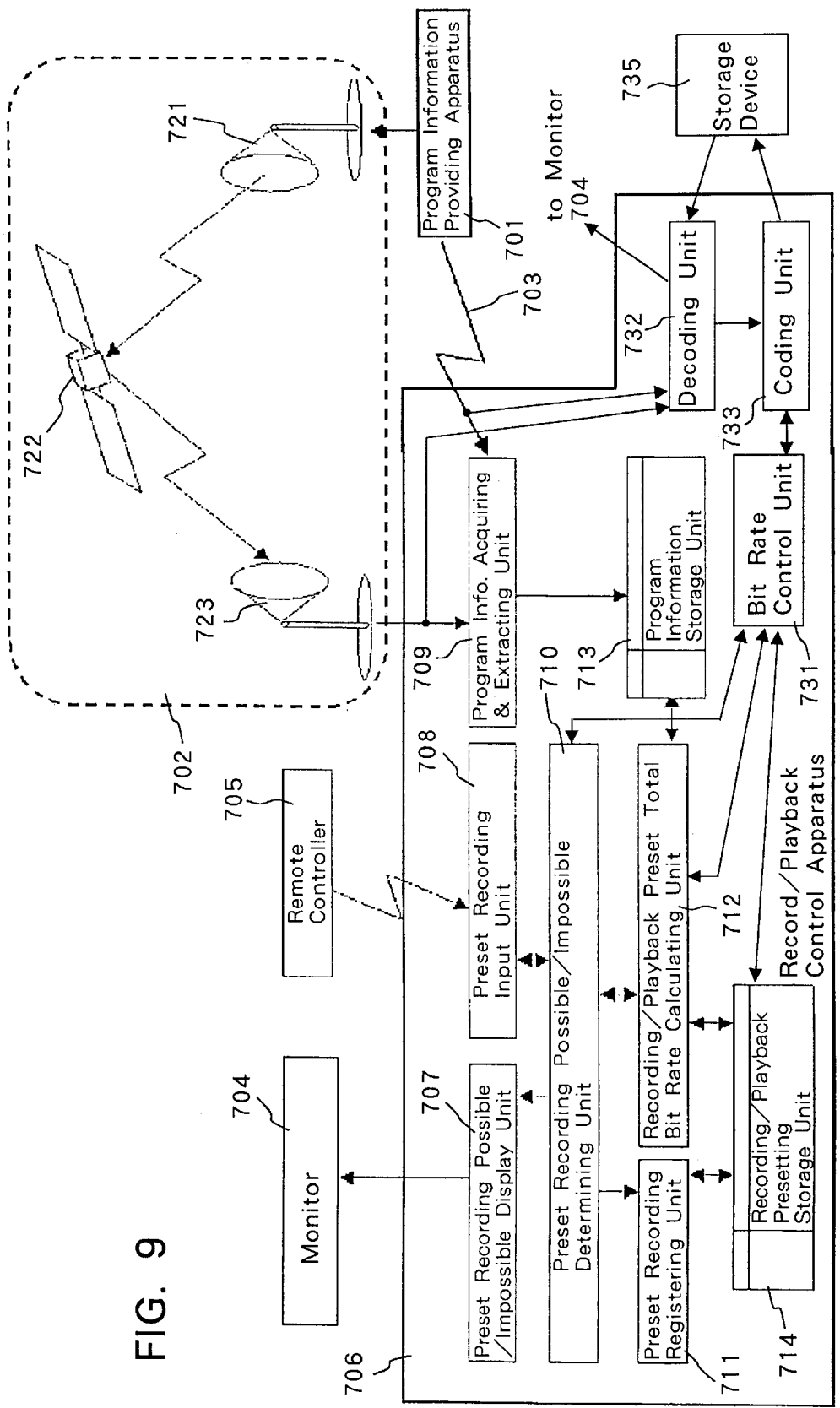
FIG. 9 is a block diagram showing an example of a configuration of a record/playback control apparatus using ground broadcasting or satellite broadcasting based on the present invention.

FIG. 9 is a block diagram showing an example of a configuration of a record/playback control apparatus which operates on the basis of an EPG delivered with push type through ground broadcasting 703 or satellite broadcasting 702. Record/playback control apparatus 706 comprises, similarly to the record/playback control apparatus shown in FIG. 7, preset recording possible/impossible display unit 707, preset recording input unit 708, program information acquiring and extracting unit 709, preset recording possible/impossible determining unit 710, preset recording registering unit 711, recording/playback preset total bit rate calculating unit 712, program information storage unit 713 and recording/playback presetting storage unit 714. However, record/playback control apparatus 706 differs from the record/playback control apparatus shown in FIG. 7 in that program information acquiring unit 709 acquires and interprets an EPG sent from program information providing apparatus 701 through broadcasting and stores the EPG in program information storage unit 713 at any time. Program information providing apparatus 701 and program information acquiring and extracting unit 709 are connected with ground broadcasting 703 or satellite broadcasting 702. The path of satellite broadcasting 702 comprises transmitting antenna 721 connected to program information providing apparatus 701, satellite 722 in orbit and receiving antenna 723 connected to program information acquiring and extracting unit 709.

Figure 10:
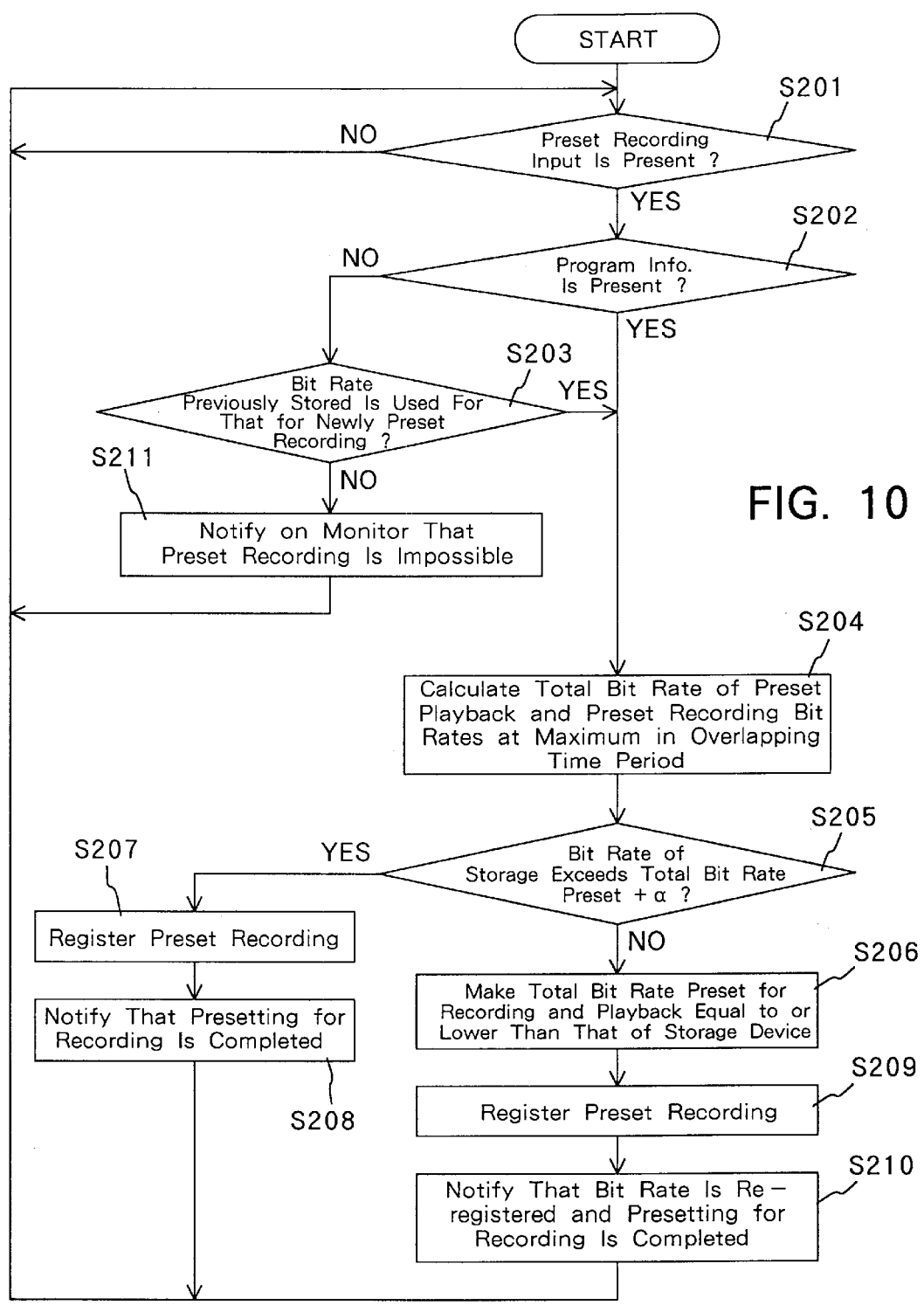
FIG. 10 is a flow chart explaining processing in the record/playback control apparatus shown in FIG. 9.

Next, the operation of record/playback control apparatus 706 will be described using a flow chart shown in FIG. 10.

First, at step S201, program presetting input unit 708 determines whether a preset recording input from remote controller 705 is present or not. If no preset recording input is present, the procedure returns to step S201 to wait for a preset recording input. If a preset recording input is present, program presetting input unit 708 causes control to transfer to step S202 in order for preset recording possible/impossible determining unit 710 to determine whether the preset recording is possible or not. Processing from step S202 to step S205 below is provided for preset recording possible/impossible determining unit 710 to cause recording/playback preset total bit rate calculating unit 712 to calculate the sum of bit rates of all contents preset for recording/playback.

At step S202, recording/playback preset total bit rate calculating unit 712 reads an EPG for a program of newly preset recording from program information storage unit 713 to read a bit rate of a newly preset content for recording, and determines whether program information on preset recording input is present or not. If an EPG to be newly preset for recording is present in program information storage unit 713, control transfers to step S204, or to step S203 if no EPG is present.

At step S203, since no EPG corresponding to the new preset recording is present in program information storage unit 713, a bit rate of a previously stored content is stored as a bit rate of a newly preset content for recording in program information storage unit 713. Thereafter, control transfers to step S204. If the bit rate of the previously stored content is not used for the bit rate of the newly preset content for recording at step S203, preset recording possible/impossible display unit 707 notifies the user that the presetting of the recording is impossible on monitor 704 at step S211 and the process for preset recording is terminated.

At step S204, recording/playback preset total bit rate calculating unit 712 reads presetting information for recording/playback which is already set in the same time period as the new preset recording from recording/playback presetting storage unit 714, calculates a total bit rate of contents at the maximum in the overlapping time period, and passes it to preset recording possible/impossible determining unit 710. Thereafter, control transfers to step S205.

At step S205, preset recording possible/impossible determining unit 710 determines whether the aforementioned expression (1) is satisfied. If the expression (1) does not hold, at step S206, preset recording possible/impossible determining unit 710 directs bit rate control unit 731 to make a total bit rate preset for recording/playback equal to or lower than a bit rate of storage device 735. Bit rate control unit 731 processes bit rates of respective contents for recording and playback such that the bit rate of respective contents is equal to or lower than the bit rate of storage device 735, re-registers the result in recording/playback presetting storage unit 714 as a bit rate of respective contents for recording/playback, and control transfers to step S209. At step S209, preset recording possible/impossible determining unit 710 causes preset recording registering unit 711 to register the presetting of the recording in recording/playback presetting storage unit 714. At step S210, preset recording possible/impossible display unit 707 notifies a user that the bit rate of respective contents for recording/playback is re-registered and the presetting of the recording is completed, by displaying the fact on monitor 704. Thereafter, processing returns to step S201. On the other hand, if the expression (1) holds at step S205, preset recording possible/impossible determining unit 710 causes preset recording registering unit 711 to register the preset recording in recording/playback presetting storage unit 714 at step S207, and causes preset recording possible/impossible display unit 707 to display that the presetting of the recording is complete on monitor 704 to notify the user of the fact at step S208, and then control transfers to step S201.

In this manner, record/playback control apparatus 706 refers to a bit rate of a content described in an EPG in performing the presetting of a recording and compares a total bit rate of contents preset for recording and playback in the same time period, i.e. a processing amount for preset recordings, with a bit rate in processing performance of the record/playback control apparatus. Whether the presetting of a recording is possible or not is determined at the stage of presetting of the recording. This enables an appropriate preset recording without fail of recording with record/playback control apparatus 706. Additionally, whether a preset recording is possible or not is determined using a total bit rate of contents at the maximum in the same time period as a new preset recording, thereby allowing an appropriate preset recording without fail of recording even in the case of a preset recording which has only a portion of a recording time overlapping with already set contents.

In the above description, if an EPG which has a bit rate of a content described therein can not be acquired at step S202, control transfers to step S203 and a bit rate of a previously stored content is used in the subsequent processing in place of a bit rate of a newly preset content for recording. With such processing, it is possible to perform the presetting of a recording appropriately even if an EPG is not available.

At the time of operation of recording/playback, bit rate control unit 731 reads the registered bit rate of contents from recording/playback presetting storage unit 714 and the registered bit rate controls bit rate control unit 731 which outputs a bit rate control signal to coding unit 733. Simultaneously, decoding unit 732 decodes content data inputted thereto. At playback, the decoded content data is sent to monitor 704 which displays the content. At recording, the decoded content data is received by coding unit 733 which compresses and codes the decoded content data and stores it in storage device 735 with control of the bit rate control signal. Examples of methods of controlling a bit rate may include control of a time average value of bit rates for allocating codes in accordance with values of bit rates. Another example of methods of controlling a bit rate may include control of color difference information in accordance with values of bit rates. A yet further example of methods of controlling a bit rate may include control of brightness information in accordance with values of bit rates.

However, the processing contents of record/playback control apparatus 706 is not limited thereto. For example, if an EPG can not be acquired at step S202, control may transfer to step S206 to make the presetting of a recording impossible. Such processing can easily prevent a failure of a preset recording.

Alternatively, if the expression (1) does not hold at step S205, preset recording possible/impossible determining unit 710 notifies a user that the preset recording is impossible by displaying the fact on monitor 704 with preset recording possible/impossible display unit 707.

While in the aforementioned respective record/playback control apparatuses, an EPG which has a bit rate of a content described therein is acquired with a communication line or broadcasting, an EPG may be delivered to a record/playback control apparatus using a removable record medium in which an EPG is recorded. In this case, a data read device from the removable record medium may be used as program information acquiring and extracting unit 612 or 709. When a removable record medium is used, similar effects to those of the aforementioned cases can be also obtained.

Figure 11:
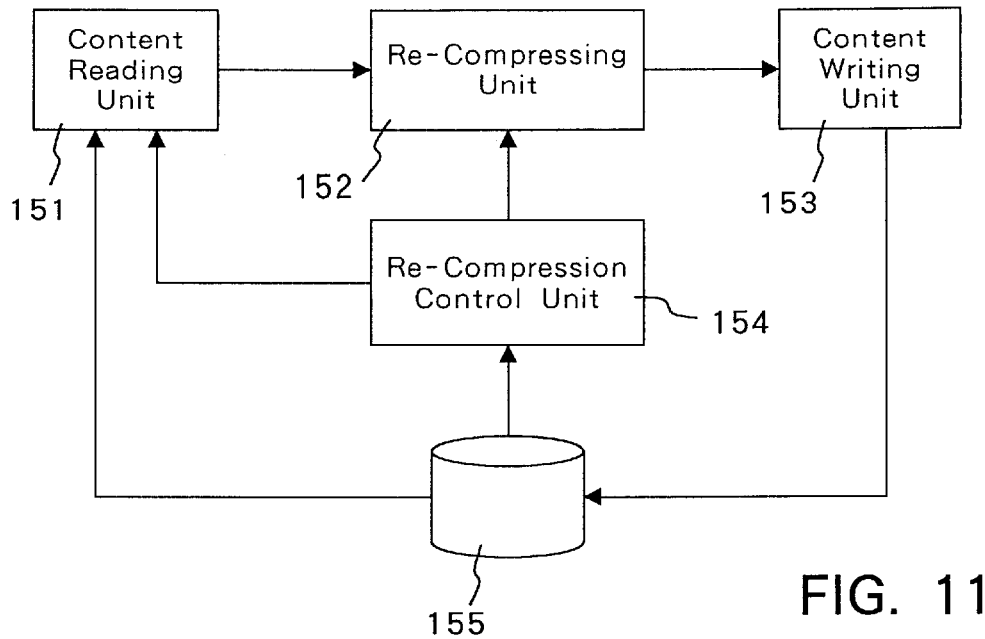
FIG. 11 is a block diagram showing a configuration for re-compression in a preferred embodiment.

FIG. 11 is a block diagram showing a configuration for re-compression in the record/playback control apparatus in the embodiment. The configuration comprises content reading unit 151 for reading out contents from storage device 155 which stores contents, re-compressing unit 152 for re-compressing the coded information which is read out from storage device 155, content writing unit 153 for writing the re-compressed content data into storage device 155, and re-compression control unit 154 for issuing directions for start/stop to re-compressing unit 152. Re-compressing unit 152 is realized with the decoding unit and coding unit shown in FIGS. 7 and 9 connected in series. Storage device 155 is identical to the storage device shown in FIGS. 7 and 9. When a direction for re-compression is issued from re-compression control unit 154 to content reading unit 151 and re-compressing unit 152, content reading unit 151 reads a content from storage device 155 and sends it to re-compressing unit 152. Re-compressing unit 152 sequentially re-compresses data of the content sent thereto and sends it to content writing unit 153. Content writing unit 153 writes the data of the re-compressed content into storage device 155. At this point, the re-compressed data may be once written in a temporary memory area (not shown) and then replace the original content after the re-compressing is completed. However, since the re-compressed data is reduced in size as compared with the original data, the read content may be overwritten with the re-compressed version. For the rate of re-compression, a re-compression rate (for example, 0.8) may be notified from re-compressing control unit 154 to re-compressing unit 152, or a re-compression rate may be previously stored in re-compressing unit 152.

Figure 12:
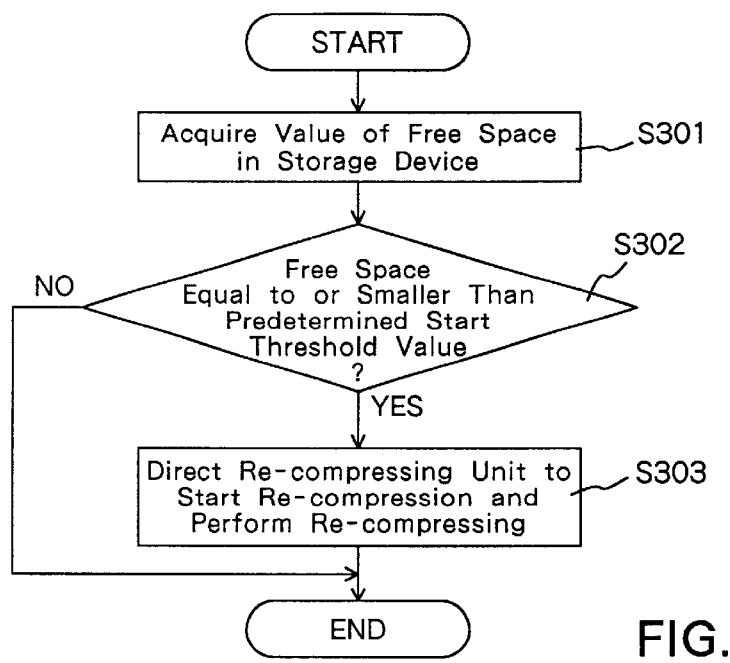
FIG. 12 is a flow chart showing control processing performed by a re-compression control unit.

FIG. 12 is a flow chart showing control processing performed by re-compressing control unit 154 in FIG. 11. First, at step S301, the value of a free space in storage device 155 is acquired. Next, at step S302, the acquired free space is compared with a start threshold value which is set in advance in re-compressing control unit 154. If the free space is larger than the start threshold value, the processing is terminated without further operations. If the free space is equal to or smaller than the start threshold value, control transfers to step S303. At step S303, re-compressing control unit 154 directs re-compressing unit 152 to start re-compression, and terminates processing after re-compression is completed. It is possible to increase a free space to a specified value by repeating the processing in FIG. 12 at appropriate intervals (for example, every several seconds) even when one-time re-compression can not result in a free space equal to or higher than the start threshold value. A content to be re-compressed may be the same content or a different content.

Figure 13:
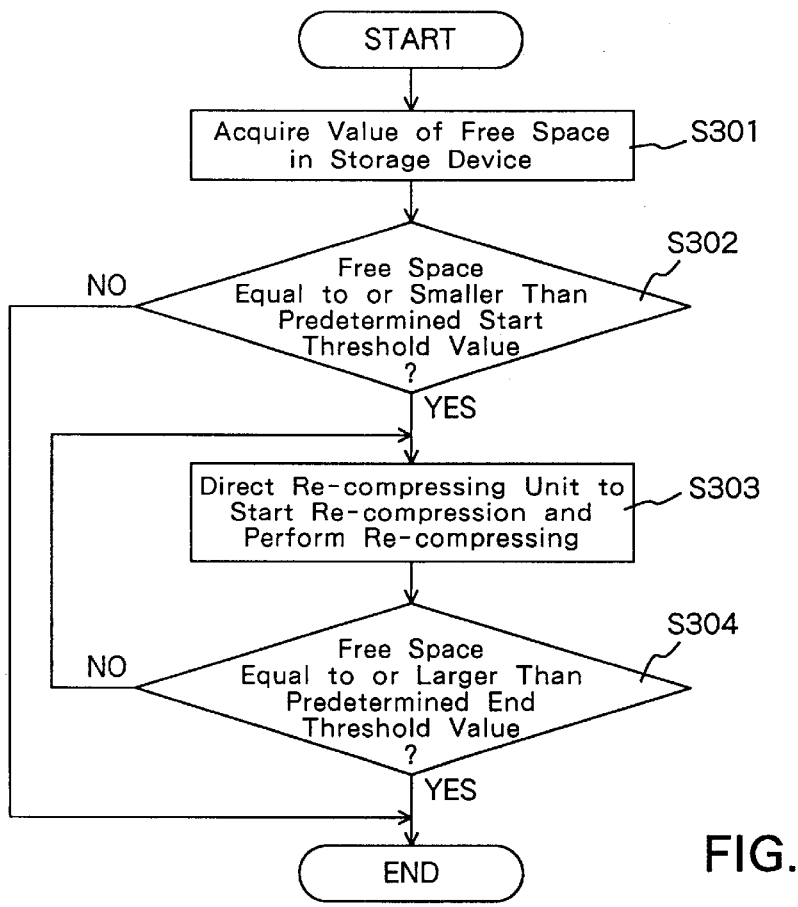
FIG. 13 is a flow chart showing control processing performed by the re-compression control unit when an end threshold value is set.

FIG. 13 is a flow chart in a case where an end threshold value is set in re-compression control unit 154. Processing from start to step S303 is identical to that in FIG. 12. After re-compression is completed at step S303, a free space is compared with a preset end threshold value at step S304. If the free space is smaller than the end threshold value, the procedure returns to step S303 to perform re-compression, or the procedure is terminated if the free space is equal to or larger than the end threshold value. With this processing, when a free space is so reduced that re-compression is required, re-compression can be repeatedly performed at a time until a sufficient free space is obtained. Contents can be re-compressed when a free space in the storage device becomes equal to or smaller than the start threshold value by periodically repeating the processing in FIG. 13.

Figure 14:
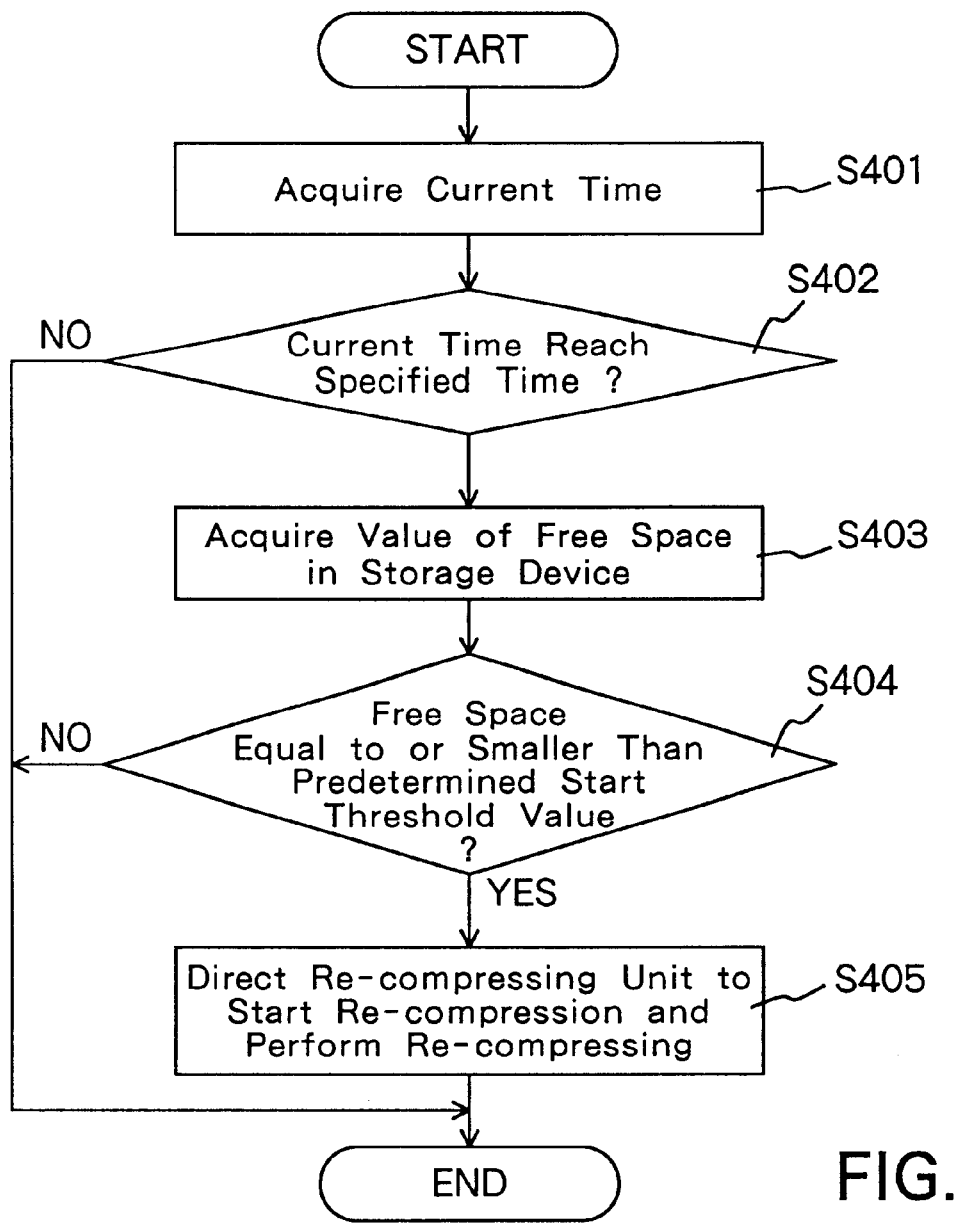
FIG. 14 is a flow chart showing processing for re-compression during a specified time period.

The re-compression may be not only started with a direction from re-compression control unit 154 to re-compressing unit 152 when a free space in storage device 155 becomes insufficient, but also performed during a specified time period. FIG. 14 is a flow chart showing processing for re-compression performed during a specified time period. Re-compression control unit 154 acquires a current time at step S401 and checks whether the current time reaches a specified time at step S402. The check may be performed in accordance with the following expression:

$$\text{specified time } A \leq \text{current time} \leq \text{specified time } B \qquad (2)$$

If the expression (2) is not satisfied, the processing is terminated. If satisfied, the value of a free space in storage device 155 is acquired at step S403, and a check is made to determine whether the free space is equal to or smaller than a start threshold value at step S404. If it is larger than the threshold value, the processing is terminated, or transfers to step S405 if it is equal to or smaller than the threshold value. At step S405, re-compression control unit 154 directs re-compressing unit 152 to start re-compression for performing re-compression. With the operations shown in FIG. 14 repeated periodically (for example, every several seconds), re-compression can be performed at a specified time and when a free space in the storage device is equal to or smaller than a specified threshold value. While re-compression can be performed at a specified time if the specified time A and specified time B in the expression (2) are set to be substantially the same, the following expression (3) may be used:

$$\text{Specified time } A \leq \text{Current time} \qquad (3)$$

Figure 15:
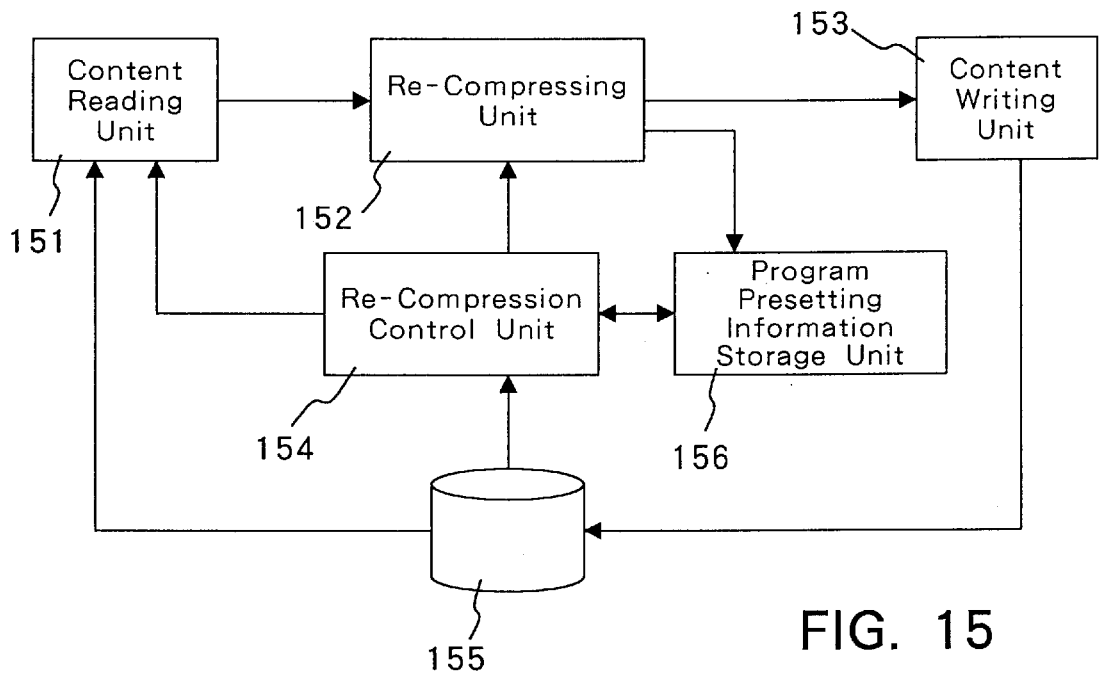
FIG. 15 is a block diagram showing a configuration for adjusting schedules of re-compression on the basis of a program presetting information.

Additionally, the timing of performing re-compression may be scheduled at a time at which no program is preset. FIG. 15 is a block diagram showing a configuration of a record/playback control apparatus for adjusting schedules of re-compression on the basis of program presetting information. The configuration in FIG. 15 is obtained by adding program presetting information storage unit 156 to the configuration shown in FIG. 11. Re-compression control unit 154, upon detecting that a free space in storage device 155 becomes equal to or smaller than a specified value, acquires program presetting information from program presetting information storage unit 156. The recording/playback presetting storage unit in the record/playback control apparatus shown in FIGS. 7 and 9 may be used as program presetting information storage unit 156.

Figures 16, 17:
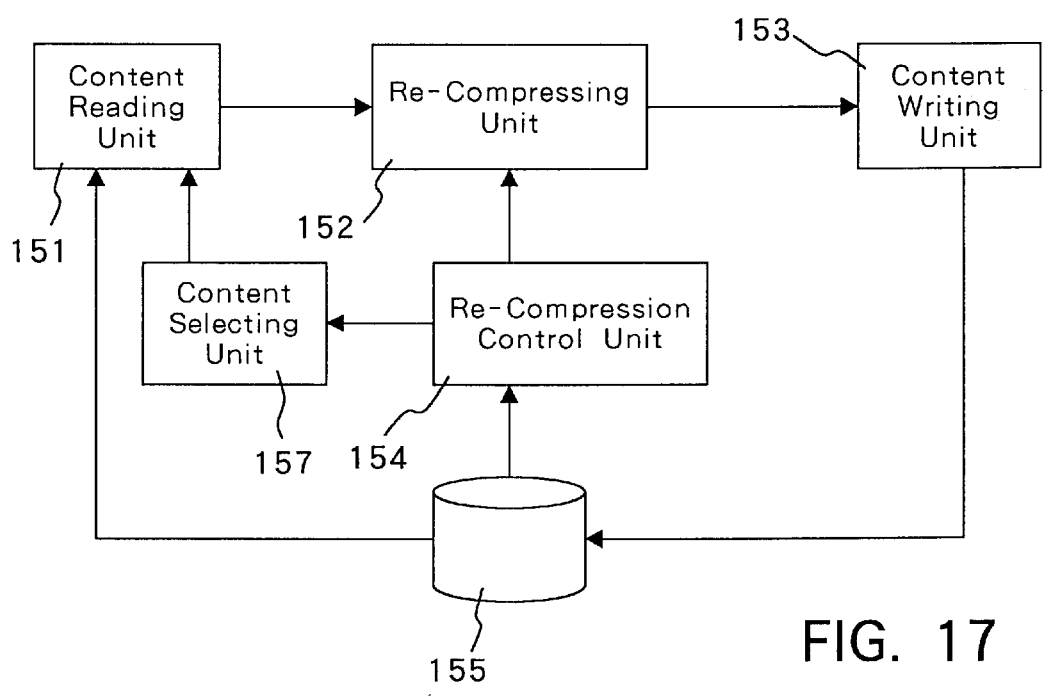
FIG. 16 is a diagram showing an example of a program presetting status.
FIG. 17 is a block diagram showing a configuration for automatically selecting a content for re-compression.

FIG. 16 shows an example of program presetting information in which recordings are preset in time periods from 17:00 to 18:00 and from 21:00 to 23:00. Re-compression control unit 154, upon receiving such information, determines that the time periods before 17:00, from 18:00 to 21:00 and after 23:00 are free, thereby making it possible to adjust schedules such that re-compressing is completed within the free time periods. For example, if the time required for re-compression is the same as that for playing back a content, the playback time of a content of interest is checked and re-compression is scheduled in the earliest possible time period in consideration of free time periods.

FIG. 17 is a block diagram showing a configuration of a record/playback control apparatus for automatically selecting a content for re-compression. The apparatus has a configuration obtained by adding content selecting unit 157 for selecting a content to be re-compressed to the configuration shown in FIG. 11. Re-compression control unit 154 issues a direction for re-compression to content selecting unit 157 and re-compressing unit 152. Content selecting unit 157 selects a content in accordance with a content selecting criterion stored therein and indicates the content to be read to content reading unit 151. Components other than that are identical to those of the apparatus shown in FIG. 11.

Several methods may be contemplated for selecting a content at content selecting unit 157 as described below.

First, selection based on importance of contents is contemplated. A user records a content together with the importance thereof. For example, the importance is ranked A, B and C such that A is defined as non-target for re-compression, B as normal, and C as positively re-compressed. Then, content selecting unit 157, upon receiving a direction for re-compression from re-compression control unit 154, accesses a list of contents in storage device 155, selects a content placed in C rank, and sends it to content reading unit 151. This enables re-compression to begin with a content having little importance. It goes without saying that the importance of contents may be modified later by a user.

Next, selection based on dates of contents is contemplated. A content is recorded together with the date and time of the recording. Content selecting unit 157, upon receiving a direction for re-compression, accesses a list of contents in storage device 155, selects a content with the oldest date, and sends it to content reading unit 151. This enables re-compression of contents in order of occurrence. Other than the date and time of recording contents, date and time of accessing contents may be recorded for performing re-compression in order of access time.

Additionally, selection based on sizes of contents is contemplated. A content is recorded together with the size thereof. Content selecting unit 157, upon receiving a direction for re-compression, accesses a list of contents in storage device 155, selects a content with the largest size, and sends it to content reading unit 151. This can ensure a large free space with a small number of re-compressions.

The aforementioned methods may be used in combination. For example, considering both importance and dates of contents, re-compression can be performed beginning with the oldest content of contents in a little importance rank.

Figure 18:
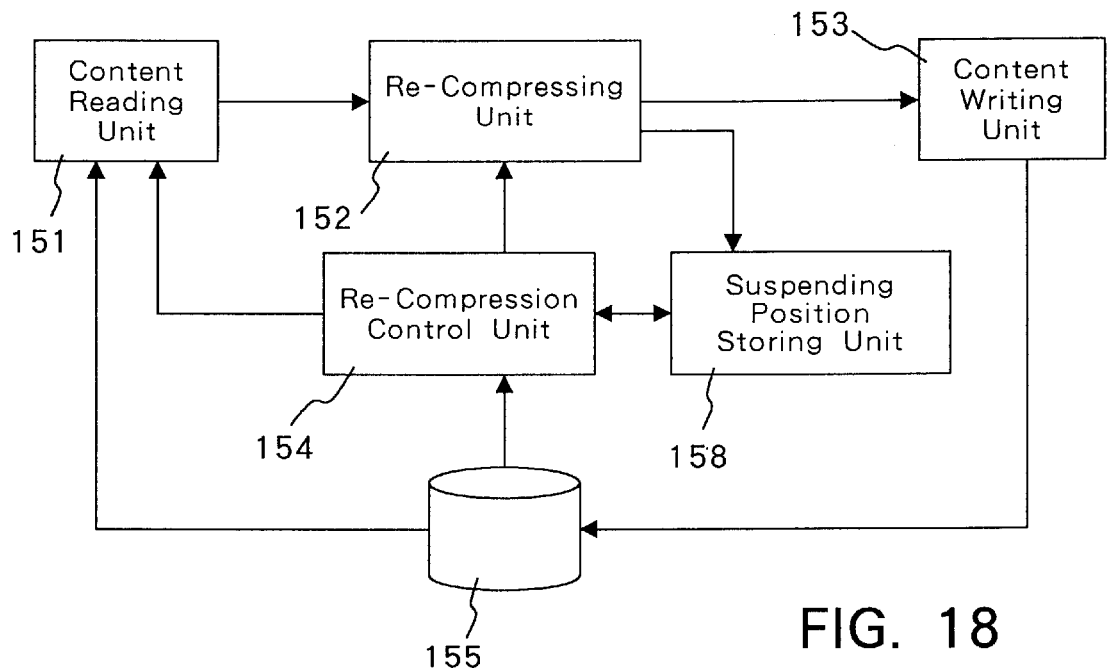
FIG. 18 is a block diagram showing a configuration for re-compression capable of suspending/resuming re-compression processing.

FIG. 18 is a block diagram showing a configuration of a record/playback control apparatus capable of suspending/resuming re-compression processing. The apparatus has a configuration obtained by adding suspending position storing unit 158 for storing a suspending position to the apparatus shown in FIG. 11.

First, processing before suspension will be described. Re-compression control unit 154 issues a direction for starting re-compression to content reading unit 151 and re-compressing unit 152. Content reading unit 151 reads a content from storage device 155 and sends it to re-compressing unit 152. Re-compressing unit 152 divides the sent data in units of GOP (Group of Pictures) and stores the number of bites in the content to which the end point corresponds (referred to as read suspending position). Additionally, re-compressing unit 152 performs re-compression in units of data divided into each GOP and sends it to content writing unit 153. Assuming that re-compression control unit 154 issues a direction for suspension to content reading unit 151 and re-compressing unit 152, content reading unit 151 stops the reading of a content. On the other hand, re-compressing unit 152 terminates re-compression in GOP underway and stores the internally stored read suspending position in suspending position storing unit 158. Content writing unit 153 writes up to finally received re-compressed data in storage device 155 and then terminates. When the invoked content is overwritten with re-compressed data, write suspending position is also stored in suspending position storing unit 158.

Next, resumption processing will be described. Re-compression control unit 154 receives the suspending position read from suspending position storing unit 158 and sends it to content reading unit 151. Content reading unit 151 opens the content at the suspension, moves a pointer to the read suspending position, reads data after the read suspending position, and sends it to re-compressing unit 152. Content writing unit 153 opens the content at the suspension and advances a pointer to the last. However, when the invoked content is overwritten with re-compressed data, content writing unit 153 advances the pointer to the write suspending position read from suspending storing unit 158. Then content writing unit 153 writes data outputted from re-compressing unit 152 from the current pointer. The remainder is similar to normal operations. It should be noted that suspending position storing unit 158 may be a memory such as RAM (random access memory), in which case a read suspending position is lost as the system is powered off. When a read suspending position is preferably maintained even with the power off, a non-volatile medium may be used as suspending position storing unit 158, for example, a non-volatile memory, a memory with power backup, or a disk device. When a disc device is used, suspending position storing unit 158 and storage device 155 may use the same disk.

Figure 19:
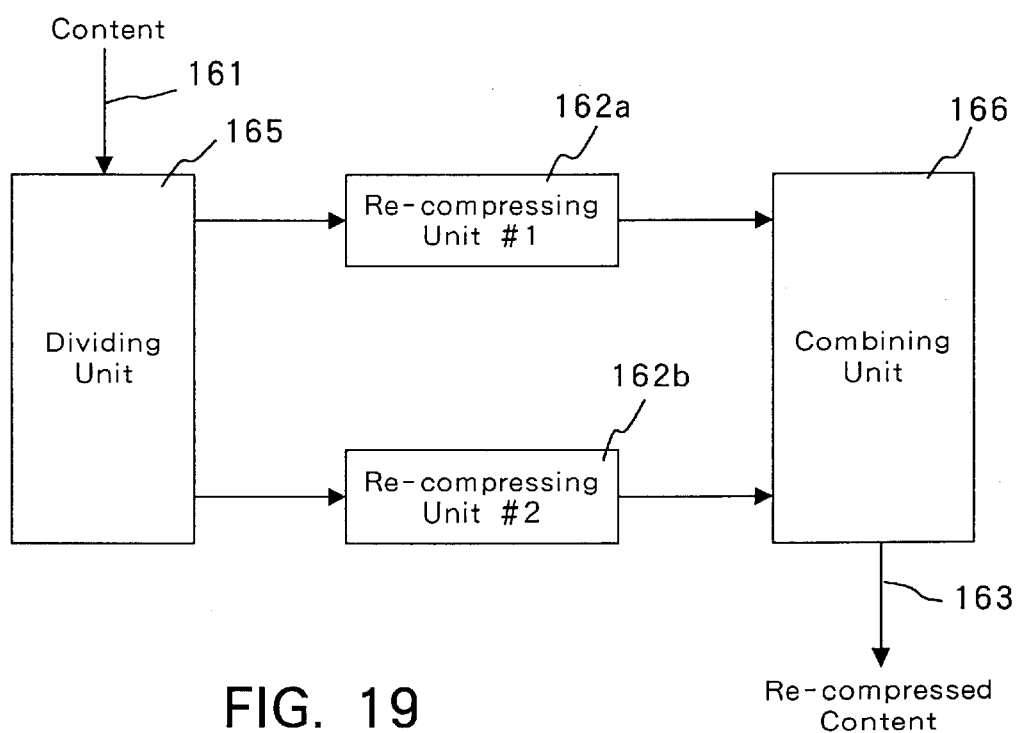
FIG. 19 is a block diagram showing a configuration for performing re-compression at high speed.

FIG. 19 is a block diagram showing a configuration of a record/playback control apparatus capable of performing re-compression processing at high speed. In the apparatus, two re-compressing units 162a and 162b are provided such that when content 161 is re-compressed, dividing unit 165 divides one content into two, i.e. the first half and the latter half which are inputted to re-compressing unit 162a and re-compressing unit 162b respectively for re-compression. At the time of output, outputs from re-compressing unit 162a and re-compressing unit 162b are combined by combining unit 166, resulting in one re-compressed content 163. In this manner, re-compression is achieved at high speed.

Next, description will be made for how one content is divided and simultaneously re-compressed.

Figure 20:
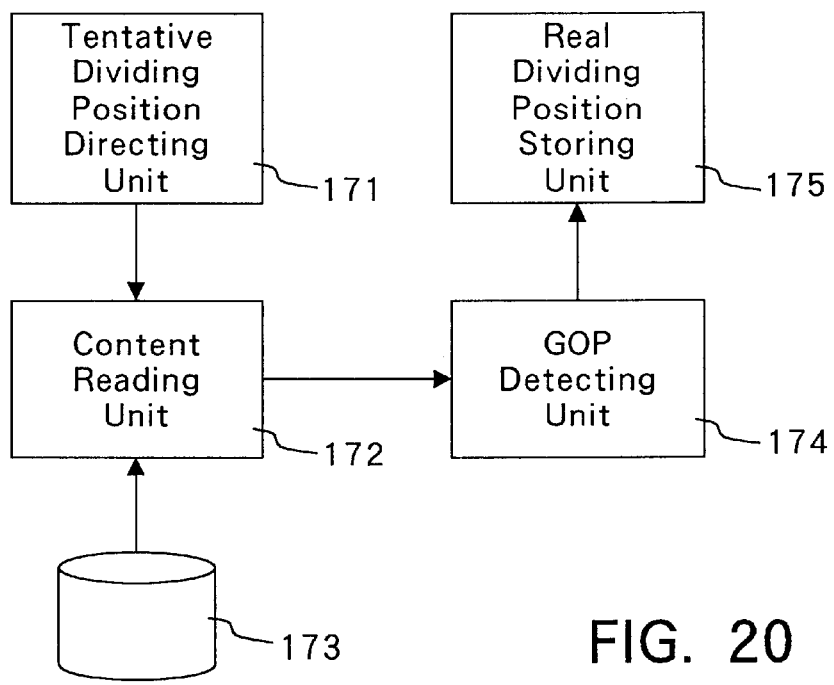
FIG. 20 is a block diagram showing a configuration for detecting dividing positions in a content in high speed re-compression.
Figure 21:
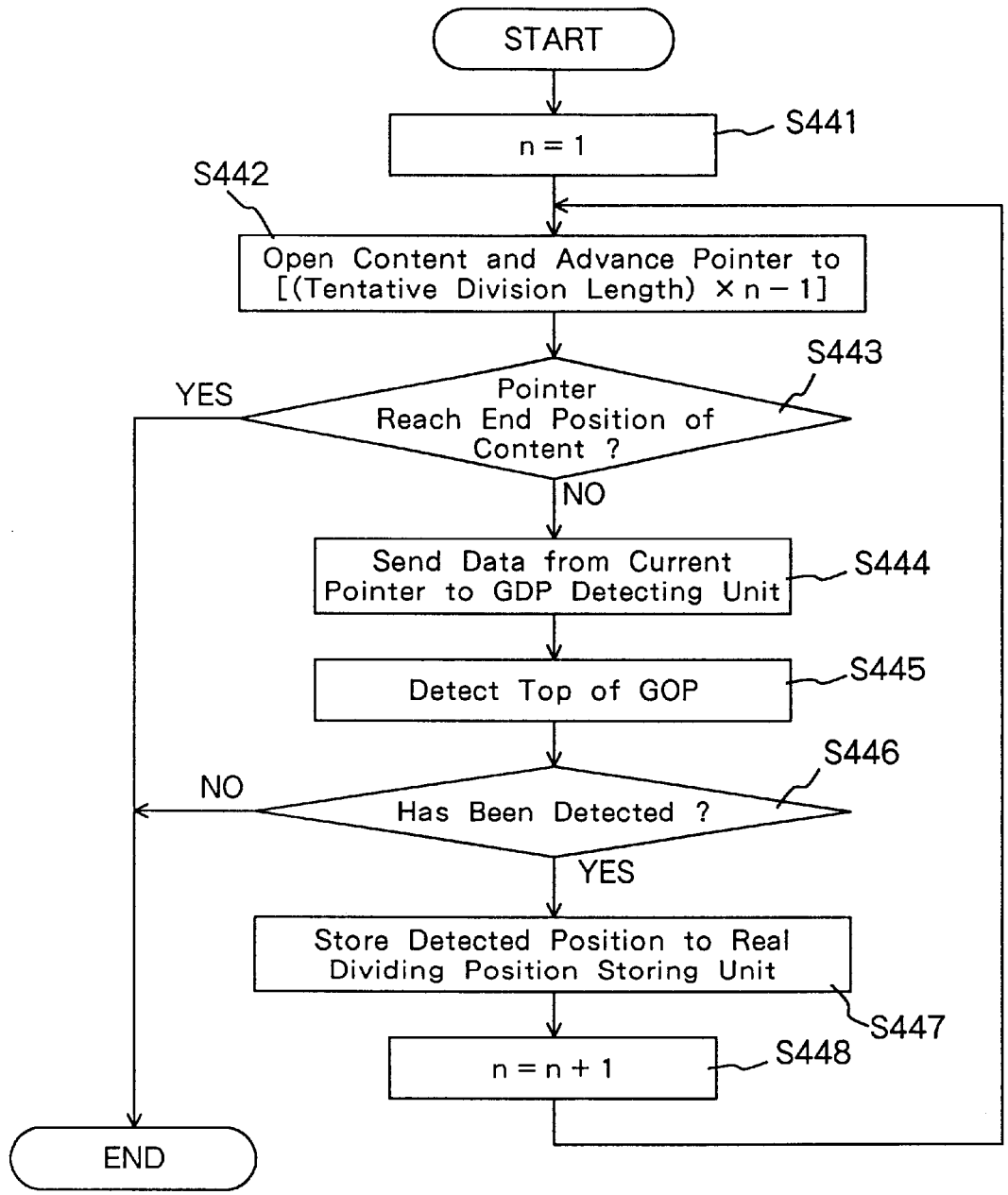
FIG. 21 is a flow chart showing processing for dividing a content in high speed re-compression.

First, description will be made for how a content is divided. FIG. 20 is a block diagram showing a configuration for detecting a dividing position in a content. The configuration comprises tentative dividing position directing unit 171 for storing a tentative dividing position, content reading unit 172 for reading a content from storage device 173 and skipping the content to a position received from tentative dividing position directing unit 171 to output data after the position, GOP detecting unit 174 for analyzing the data outputted from content reading unit 172 to detect the top of a GOP, and real dividing position storing unit 175 for storing an output from GOP detecting unit 174. FIG. 21 is a flow chart showing processing for dividing a content. First, at step S441, one is substituted into a control variable n. Next, at step S442, content reading unit 172 opens a content in storage device 173 and advances a pointer to a value obtained by multiplying a value received from tentative dividing position directing unit 171 by n and by subtracting one from the product. At step S443, a check is made to determine whether the position reaches an end position of the content. If so, the processing is terminated. If not, the procedure transfers to step S444. At step S444, data is sent from the current pointer to GOP detecting unit 174. Thereafter, the top of a GOP is detected at step S445, and a check is made to determined whether it has been detected at step S446. If the GOP can not be detected, the processing is terminated. If detected, at step S447, the position of the detected top of the GOP in the content is stored in real dividing position storing unit 175. At step S448, a number incremented by one is substituted into the control variable n, and the process returns to step S442.

The real dividing position thus obtained, which has a length close to a tentative dividing length and corresponds to an end of a GOP, is stored in real dividing position storing unit 175.

Figure 22:
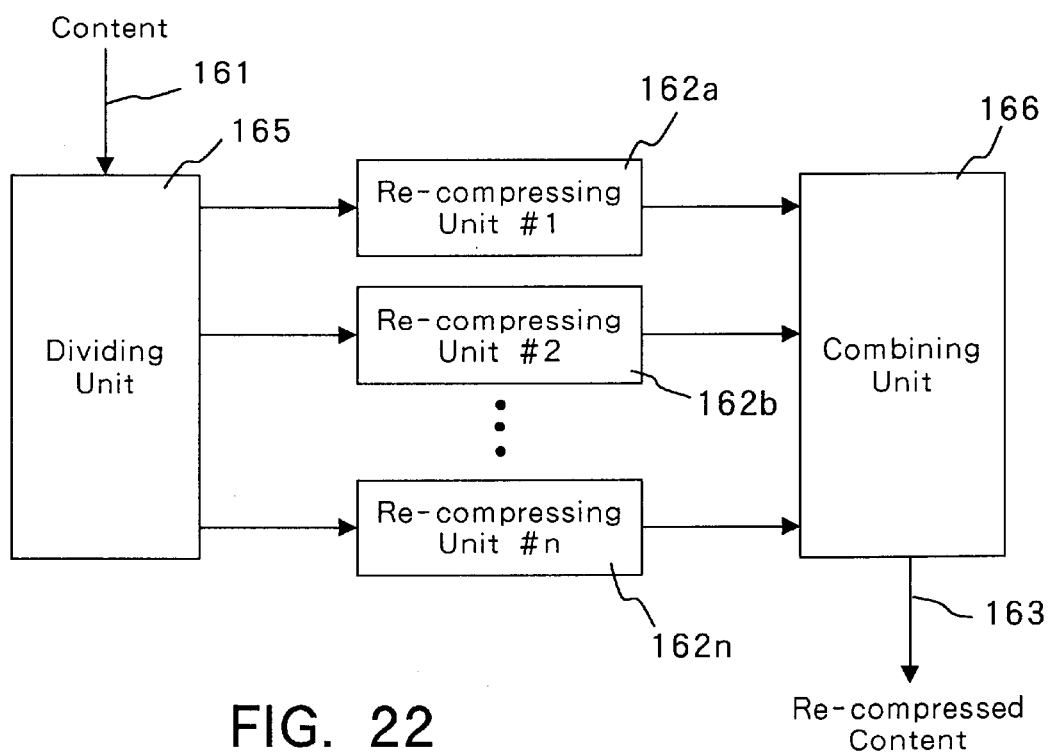
FIG. 22 is a block diagram showing another example of a configuration for performing re-compression at high speed.

FIG. 22 is a block diagram showing an exemplary variation of a record/playback control apparatus capable of performing re-compression processing at high speed. The apparatus comprises N re-compressing units 162*a* to 162*n* such that when content 161 is re-compressed, one content passing through dividing unit 165 is divided into N portions which are inputted to respective re-compressing units. At the time of output, outputs from re-compressing units 162*a* to 162*n* are combined by combining unit 166, thereby creating one re-compressed content 163. In this manner, re-compression is achieved at high speed.

Figure 23:
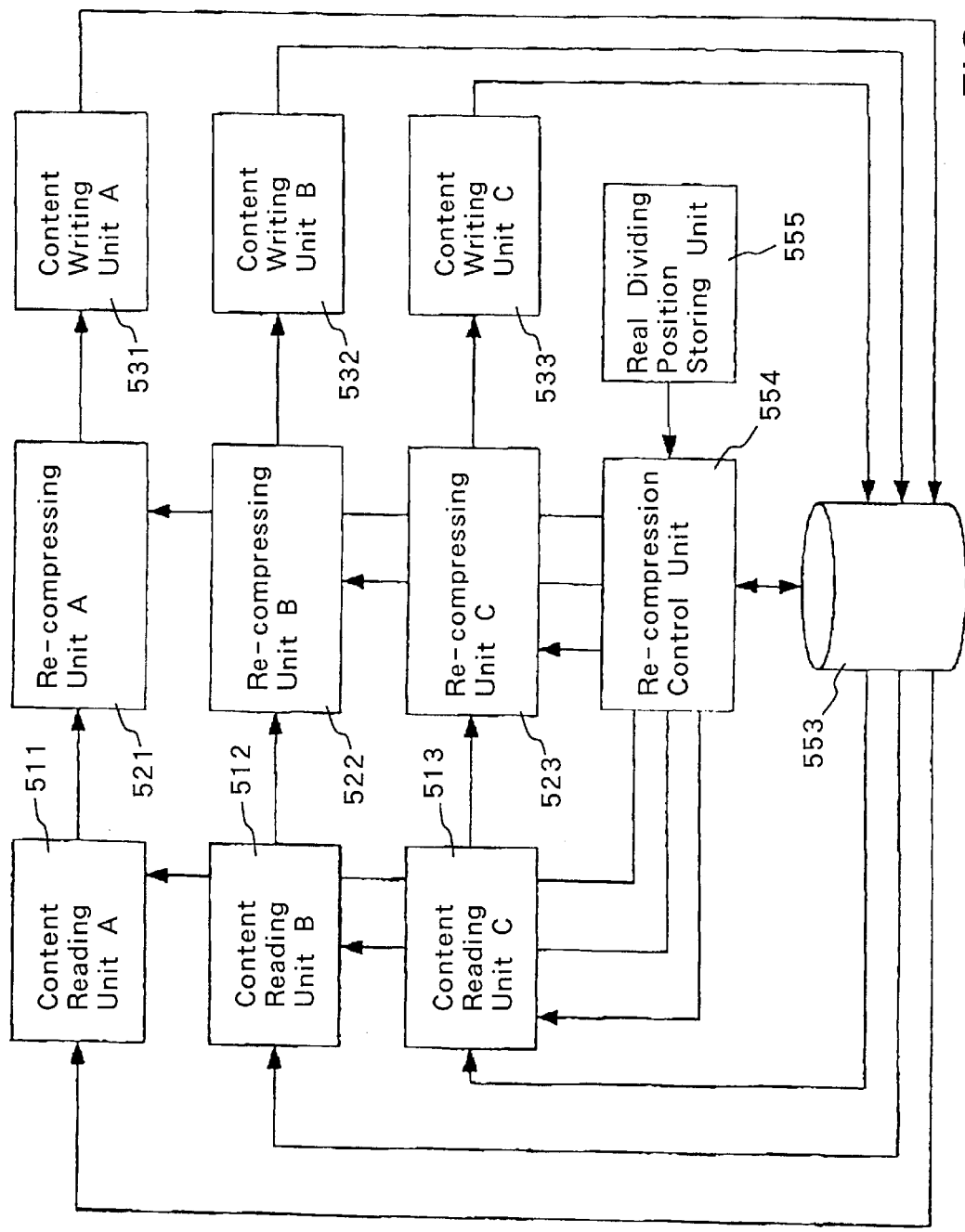
FIG. 23 is a block diagram showing a configuration for simultaneously re-compressing divided contents in high speed re-compression.
Figure 24:
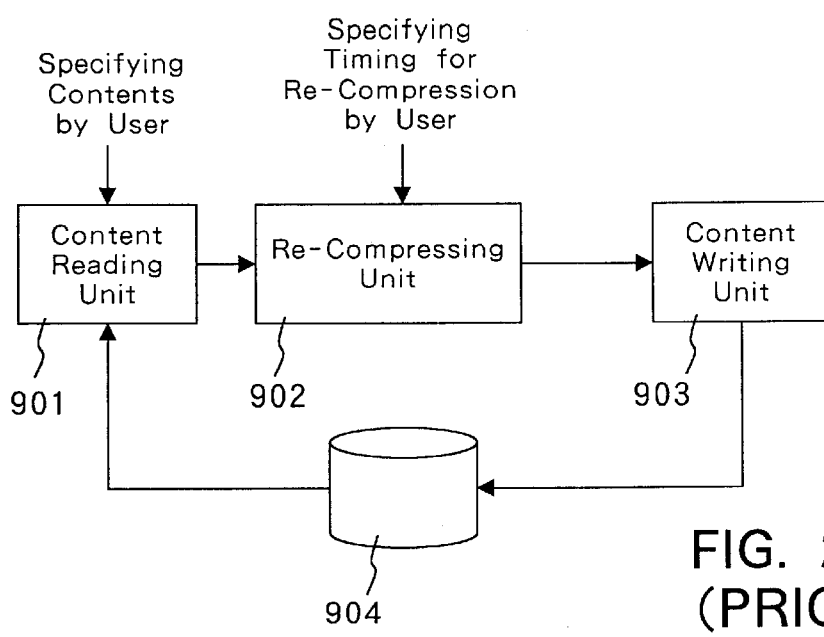
FIG. 24 is a block diagram showing a conventional configuration for increasing a free space in a storage device with re-compression.

Next, description will be made for how a plurality of divided contents are simultaneously re-compressed. FIG. 23 is a block diagram showing a configuration of an apparatus therefor. An example with three re-compressing units are herein described.

The apparatus comprises three content reading units 511 to 513 each for reading a content from storage device 553 which stores contents, re-compressing units 521 to 523 for re-compressing the read data, three content writing units 531 to 533 for writing the re-compressed data in storage device 553, re-compression control unit 554 each for issuing a direction for start/stop to re-compressing units 521 to 523, and real dividing position storing unit 555 for storing a real dividing position. When re-compression control unit 554 issues a direction for re-compression to content reading unit 511 and re-compressing unit 521, content reading unit 511 reads a content from storage device 553 and sends it to re-compressing unit 521. Re-compressing unit 521 sequentially re-compresses the data sent thereto and sends it to content writing unit 531. Content writing unit 531 writes the re-compressed data in storage device 553. Operations similar to the above are simultaneously performed in content reading units 512, 513, re-compressing units 522, 523, and content writing units 532, 533. At this point, the re-compressed data may be once written in a temporary memory area (not shown) and then replace the original content after the re-compressing is completed. However, since the re-compressed data is reduced in size as compared with the original data, the read content may be overwritten with the re-compressed version. The rate of re-compression (a re-compression rate (for example, 0.8)) may be notified from re-compressing control-unit 554 to re-compressing unit 521,or a re-compression rate may be previously stored in re-compressing means. At the completion of all re-compression, data is merged to obtain a re-compressed content.

Additionally, re-compression can be performed when a free space in a storage device becomes equal to or smaller than a certain level. Since the time for performing re-compression can be specified, re-compression can be performed while resources required for re-compression are not used, for example at midnight. It is also possible to perform re-compression except in a time period in which a recording is preset. Since a content to be re-compressed can be automatically selected on the basis of a criterion specified by a user, an appropriate file can be selected for re-compression even when the user is not present. It is also possible to suspend/resume re-compression processing. Furthermore, division of a content for re-compression enables re-compression at higher speed as compared with re-compression of a content while it is played back.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A program information providing apparatus for delivering an electronic programming guide utilizing a bidirectional communication path, comprising at least:

delivery request receiving means for receiving a delivery request for the electronic programming guide;

delivery controlling means for managing the delivery request for the electronic programming guide and controlling the delivery thereof;

program information delivering means for delivering the electronic programming guide; and program information creating means for producing an electronic programming guide comprising a bit rate of a content described in the electronic programming guide.

2. The program information providing apparatus according to claim 1, wherein the bit rate of a content described in the electronic programming guide is described for each station in the electronic programming guide.

3. The program information providing apparatus according to claim 1, wherein the bit rate of a content described in the electronic programming guide is described for each channel in the electronic programming guide.

4. The program information providing apparatus according to claim 1, wherein the bit rate of a content described in the electronic programming guide is described for each program in the electronic programming guide.

5. The program information providing apparatus according to claim 1, wherein the electronic programming guide created by said program information creating means is transferred to said delivery controlling means through a storage medium.

6. A program information providing apparatus for delivering an electronic programming guide through broadcasting, comprising at least:

delivery controlling means for controlling delivery of the electronic programming guide;

program information delivering means for delivering the electronic programming guide; and program information creating means for producing an electronic programming guide comprising a bit rate of a content described in the electronic programming guide.

7. The program information providing apparatus according to claim 6, wherein the bit rate of a content described in the electronic programming guide is described for each station in the electronic programming guide.

8. The program information providing apparatus according to claim 6, wherein the bit rate of a content described in the electronic programming guide is described for each channel in the electronic programming guide.

9. The program information providing apparatus according to claim 6, wherein the bit rate of a content described in the electronic programming guide is described for each program in the electronic programming guide.

10. The program information providing apparatus according to claim 6, wherein the electronic programming guide created by said program information creating means is transferred to said delivery controlling means through a storage medium.

11. A program information providing apparatus for delivering an electronic programming guide through a storage medium, comprising at least:

delivery controlling means for controlling delivery of the electronic programming guide;

program information delivering means for storing the electronic programming guide in the storage medium to deliver the electronic programming guide; and program information creating means for producing an electronic programming guide comprising a bit rate of a content described in the electronic programming guide.

12. A program information providing system for delivering an electronic programming guide utilizing a bidirectional communication path, comprising:

a program information creating apparatus having program information creating means for producing an electronic programming guide comprising a bit rate of a content described in the electronic programming guide, a program information providing apparatus having delivery controlling means for controlling delivery of the electronic programming guide, and program information delivering means for delivering the electronic programming guide; and a local area network for passing the electronic programming guide created by said program information creating apparatus to said program information providing apparatus.

13. A program information providing system for delivering an electronic programming guide through broadcasting, comprising:

a program information creating apparatus having program information creating means for producing an electronic programming guide describing a bit rate of a content described in the electronic programming guide, a program information providing apparatus having delivery controlling means for controlling the delivery of the electronic programming guide, and program information delivering means for delivering the electronic programming guide; and a local area network for passing the electronic programming guide created by said program information creating apparatus to said program information providing apparatus, wherein the electronic programming guide in which a bit rate of a content is described is delivered.

14. A record/playback control apparatus for acquiring an electronic programming guide in which a bit rate of a content is described, comprising:

program information acquiring means for acquiring and extracting the electronic programming guide;

program information storage means for storing the electronic programming guide;

recording instruction input means for receiving recording instruction information;

recording/playback instruction total bit rate calculating means for calculating a total bit rate of contents instructed for recording/playback at a particular time;

recording/playback instruction storage means for storing recording/playback instructions;

recording instruction registering means for registering a new recording instruction;

recording instruction possible/impossible display means for displaying whether an instructed recording is possible or not; and recording instruction possible/impossible determining means for determining whether an instructed recording is possible or not using the bit rate of a content described in the electronic programming guide.

15. The record/playback control apparatus according to claim 14, wherein the electronic programming guide is acquired with a bidirectional communication path.

16. The record/playback control apparatus according to claim 14, wherein the electronic programming guide is acquired with broadcasting.

17. The record/playback control apparatus according to claim 14, wherein the electronic programming guide is acquired with a storage medium.

18. The record/playback control apparatus according to claim 14, wherein said recording instruction possible/impossible determining means determines that a new recording instruction cannot be executed when the sum of bit rates of contents already set for recording and playback and a bit rate of a newly instructed content for recording in the same time period exceeds a bit rate of said record/playback control apparatus.

19. The record/playback control apparatus according to claim 18, wherein said record/playback possible/impossible determining means determines whether a recording instruction is possible or not using maximum bit rates of contents in the same time period as the newly instructed recording, calculated by said recording/playback instruction total bit rate calculating means.

20. The record/playback control apparatus according to claim 18, further comprising bit rate changing means for changing a bit rate of a content, wherein said recording instruction possible/impossible determining means determines whether a recording instruction is possible or not using a maximum bit rate of contents in the same time period corresponding to the new recording instruction, calculated by said recording/playback instruction total bit rate calculating means, and when determination is made that a new recording instruction is impossible, said bit rate changing means changes a bit rate of at least one content such that the total bit rate of contents is a bit rate equal to or lower than processing capability of said record/playback control apparatus.

21. The record/playback control apparatus according to claim 20, wherein said bit rate changing means is means for automatically adjusting a bit rate of voice and video data.

22. The record/playback control apparatus according to claim 20, wherein said bit rate changing means is means for controlling color difference information.

23. The record/playback control apparatus according to claim 20, wherein said bit rate changing means is means for controlling brightness information.

24. The record/playback control apparatus according to claim 14, wherein said record/playback possible/impossible determining means determines that a new recording instruction is impossible when electronic programming guide data cannot be acquired for a program specified in a new recording instruction.

25. The record/playback control apparatus according to claim 14, wherein when electronic programming guide data cannot be acquired for a program specified in a new recording instruction, said recording/playback instruction total bit rate calculating means calculates a total bit rate from bit rates of contents already instructed for recording, bit rates of contents instructed for playback and a bit rate of the program specified in the new recording instruction for the same time period, using a bit rate of a previously stored content as a bit rate of the program specified in the new recording instruction.

26. The record/playback control apparatus according to claim 25, wherein said record/playback possible/impossible determining means determines whether a recording instruction is possible or not using a maximum bit rate of contents in the same time period as the newly instructed recording, calculated by said recording/playback instruction total bit rate calculating means.

27. The record/playback control apparatus according to claim 14, further comprising re-compressing means for re-compressing data of a content stored in a storage device connected thereto in order to make a free space in said storage device larger than a total amount of data of the contents and already instructed for recording, wherein the data of the contents newly instructed and previously instructed for recording can be stored in said storage device.

28. The record/playback control apparatus according to claim 27, wherein said re-compressing means includes decoding means for reading and decoding content data from said storage device, re-coding means for re-coding the decoded data, and means for storing the re-coded data in said storage device.

29. The record/playback control apparatus according to claim 28, wherein said re-compressing means re-compresses the data of the content stored in said storage device when a free space in said storage device is equal to or lower than a predetermined parameter.

30. The record/playback control apparatus according to claim 28, wherein said re-compressing means re-compresses the data of the content stored in said storage device until a free space in said storage device becomes equal to or higher than a predetermined parameter.

31. The record/playback control apparatus according to claim 28, wherein said re-compressing means re-compresses the data of the content in said storage device at a specified time.

32. The record/playback control apparatus according to claim 28, wherein said re-compressing means references record/playback instruction information to check a free time period and re-compresses the data of the content in said storage device during the free time period.

33. The record/playback control apparatus according to claim 28, wherein said re-compressing means re-compresses the data of the content in said storage device by using importance specified by a user as a criterion of selecting a content to be re-compressed.

34. The record/playback control apparatus according to claim 28, wherein said re-compressing means re-compresses the data of the content in said storage device by using times at which contents were created as a criterion of selecting a content to be re-compressed.

35. The record/playback control apparatus according to claim 28, wherein said re-compressing means re-compresses the data of the content in said storage device by using sizes of contents as a criterion of selecting a content to be re-compressed.

36. The record/playback control apparatus according to claim 27, wherein said re-compressing means includes decoding means for reading content data from said storage device in units of GOP (Group of Pictures) for decoding, re-coding means for re-coding the decoded data, means for storing the re-coded data in said storage device, and means for enabling suspension/resumption of re-compression in units of GOP by holding a position of a GOP for which processing has been performed.

37. The record/playback control apparatus according to claim 27, wherein said re-compressing means includes a plurality of decoding means and re-coding means independently operative, means for dividing content data into independently re-codable blocks in units of GOP (Group of Pictures), and means for storing re-coded data in said storage device, and wherein said dividing means divides content data read from storage device and said plurality of decoding means and re-coding means perform decoding and re-coding in units of the divided data.

38. The record/playback control apparatus according to claim 27, wherein said recording instruction possible/impossible determining means determines that a newly instructed recording is impossible when the sum of bit rates of contents already instructed for recording and playback and a bit rate of a newly instructed content for recording in the same time period exceeds a bit rate in processing performance of said record/playback control apparatus.

* * * * *